US011362772B2

(12) United States Patent
Nakao et al.

(10) Patent No.: US 11,362,772 B2
(45) Date of Patent: *Jun. 14, 2022

(54) RADIO COMMUNICATION APPARATUS AND RADIO COMMUNICATION METHOD

(71) Applicant: Panasonic Corporation, Osaka (JP)

(72) Inventors: Seigo Nakao, Osaka (JP); Daichi Imamura, Kanagawa (JP)

(73) Assignee: Panasonic Holdings Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,498

(22) Filed: May 10, 2021

(65) Prior Publication Data

US 2021/0266117 A1     Aug. 26, 2021

Related U.S. Application Data

(63) Continuation of application No. 16/854,633, filed on Apr. 21, 2020, now Pat. No. 11,038,633, which is a
(Continued)

(30) Foreign Application Priority Data

Oct. 29, 2007  (JP) ................. 2007-280796
Dec. 28, 2007  (JP) ................. 2007-339924
Oct. 17, 2008  (JP) ................. 2008-268690

(51) Int. Cl.
*H04L 1/18*     (2006.01)
*H04J 13/00*    (2011.01)
(Continued)

(52) U.S. Cl.
CPC ........ *H04L 1/1893* (2013.01); *H04J 13/0003* (2013.01); *H04J 13/0059* (2013.01);
(Continued)

(58) Field of Classification Search
CPC ............ H04L 5/0055; H04W 72/0413; H04W 72/042
See application file for complete search history.

(56) References Cited

U.S. PATENT DOCUMENTS 6,282,228 B1   8/2001  Monroe
6,791,995 B1   9/2004  Azenkot et al.
(Continued)

FOREIGN PATENT DOCUMENTS

CN   1783769 A     6/2006
EP   0 982 892 A2  3/2000
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 8)," Technical Specification 3GPP TS 36.211 (V8.0.0), 3rd Generation Partnership Project (3GPP™), Valbonne, France, Sep. 2007, 50 pages.
(Continued)

*Primary Examiner* — Kevin Kim
(74) *Attorney, Agent, or Firm* — Seed IP Law Group LLP

(57) ABSTRACT

Provided is a radio communication device which can make Acknowledgement (ACK) reception quality and Negative Acknowledgement (NACK) reception quality to be equal to each other. The device includes: a scrambling unit (214) which multiplies a response signal after modulated, by a scrambling code "1" or "$e^{-j(\pi/2)}$" so as to rotate a constellation for each of response signals on a cyclic shift axis; a spread unit (215) which performs a primary spread of the response signal by using a Zero Auto Correlation (ZAC) sequence set by a control unit (209); and a spread unit (218) which performs a secondary spread of the response signal
(Continued)

after subjected to the primary spread, by using a block-wise spread code sequence set by the control unit (209).

18 Claims, 19 Drawing Sheets

Related U.S. Application Data continuation of application No. 16/358,559, filed on Mar. 19, 2019, now Pat. No. 10,666,402, which is a continuation of application No. 15/808,708, filed on Nov. 9, 2017, now Pat. No. 10,284,342, which is a continuation of application No. 15/402,963, filed on Jan. 10, 2017, now Pat. No. 10,014,989, which is a continuation of application No. 15/098,249, filed on Apr. 13, 2016, now Pat. No. 9,584,264, which is a continuation of application No. 14/935,211, filed on Nov. 6, 2015, now Pat. No. 9,344,253, which is a continuation of application No. 14/818,071, filed on Aug. 4, 2015, now Pat. No. 9,215,056, which is a continuation of application No. 14/504,343, filed on Oct. 1, 2014, now Pat. No. 9,136,999, which is a continuation of application No. 14/100,997, filed on Dec. 9, 2013, now Pat. No. 8,879,603, which is a continuation of application No. 13/800,668, filed on Mar. 13, 2013, now Pat. No. 8,630,330, which is a continuation of application No. 13/397,588, filed on Feb. 15, 2012, now Pat. No. 8,422,533, which is a continuation of application No. 13/041,189, filed on Mar. 4, 2011, now Pat. No. 8,144,745, which is a continuation of application No. 12/854,020, filed on Aug. 10, 2010, now Pat. No. 7,933,309, which is a continuation of application No. 12/594,195, filed as application No. PCT/JP2008/003069 on Oct. 28, 2008, now Pat. No. 7,848,385.

(51) Int. Cl.
| | | |
|---|---|---|
| H04J 13/22 | (2011.01) | |
| H04L 5/00 | (2006.01) | |
| H04L 25/03 | (2006.01) | |
| H04L 27/26 | (2006.01) | |
| H04W 72/04 | (2009.01) | |
| H04L 1/00 | (2006.01) | |
| H04L 1/12 | (2006.01) | |

(52) U.S. Cl.
CPC .......... *H04J 13/0074* (2013.01); *H04J 13/22* (2013.01); *H04L 1/0061* (2013.01); *H04L 1/1825* (2013.01); *H04L 1/1854* (2013.01); *H04L 1/1861* (2013.01); *H04L 1/1896* (2013.01); *H04L 5/0007* (2013.01); *H04L 5/0053* (2013.01); *H04L 5/0055* (2013.01); *H04L 25/03866* (2013.01); *H04L 27/2602* (2013.01); *H04L 27/2613* (2013.01); *H04L 27/2626* (2013.01); *H04W 72/042* (2013.01); *H04W 72/0406* (2013.01); *H04W 72/0413* (2013.01); *H04L 5/006* (2013.01); *H04L 5/0091* (2013.01); *H04L 2001/125* (2013.01)

(56) References Cited

U.S. PATENT DOCUMENTS

| 7,050,419 | B2 | 5/2006 | Azenkot et al. |
|---|---|---|---|
| 7,573,852 | B2 | 8/2009 | Kim et al. |
| 7,845,385 | B2 | 12/2010 | Goodman et al. |
| 8,654,696 | B2 | 2/2014 | Fukuoka et al. |
| 9,344,253 | B2 | 5/2016 | Nakao et al. |
| 2003/0072286 | A1 | 4/2003 | Kim et al. |
| 2004/0032838 | A1 | 2/2004 | Min |
| 2006/0203935 | A1 | 9/2006 | Li et al. |
| 2007/0242764 | A1 | 10/2007 | Anigstein et al. |
| 2008/0075195 | A1 | 3/2008 | Pajukoski et al. |
| 2009/0190516 | A1 | 7/2009 | Fukuoka et al. |
| 2009/0232062 | A1 | 9/2009 | Higuchi et al. |
| 2010/0119003 | A1 | 5/2010 | Terabe et al. |
| 2010/0232388 | A1 | 9/2010 | Nakao et al. |
| 2010/0238975 | A1 | 9/2010 | Nakao et al. |

FOREIGN PATENT DOCUMENTS

| JP | 2005-27336 A | 1/2005 |
|---|---|---|
| JP | 2007-221755 A | 8/2007 |
| WO | 2007/043477 A1 | 4/2007 |
| WO | 2008/093774 A1 | 8/2008 |
| WO | 2009/057285 A1 | 5/2009 |

OTHER PUBLICATIONS

"3rd Generation Partnership Project; Technical Specification Group Radio Access Network; Evolved Universal Terrestrial Radio Access (E-UTRA); Physical Channels and Modulation (Release 8)," Technical Specification 3GPP TS 36.211 (V8.4.0), 3rd Generation Partnership Project (3GPP™), Valbonne, France, Sep. 2008, 78 pages.
"Cyclic Shift Hopping of UL ACK Channels," Report R1-073149, 3rd Generation Partnership Project (3GPP™) TSG RAN WG1 Meeting #49bis, Orlando, FL, USA, Jun. 25-29, 2007, pp. 1-6.
English Translation of Chinese Search Report dated Aug. 4, 2015, for corresponding CN Application No. 2013105113410, 2 pages.
Extended European Search Report, dated May 24, 2013, for corresponding European Application No. 12154691.5-1852/2475118, 7 pages.
Extended European Search Report, for corresponding European Application No. 08844054.0, dated Jun. 27, 2011, 6 pages.
"Implicit Resource Allocation of ACK/NACK Signal in E-UTRA Uplink," Report R1-072439, 3rd Generation Partnership Project (3GPP™) TSG RAN WG1 Meeting #49, Kobe, Japan, May 7-11, 2007, pp. 1-3.
International Search Report, for corresponding International Application No. PCT/JP2008/003069, filed Oct. 28, 2008, dated Feb. 3, 2009, 4 pages.
Invitation pursuant to Article 94(3) and Rule 71(1) EPC, dated May 18, 2012, for corresponding European Application No. 08 844 054.0, 5 pages.
Japanese Office Action, for related Japanese Application No. 2010-006911, dated May 11, 2010, 3 pages.
LG Electronics Inc., "Restriction of UL/DL subframe ratio considering PUCCH in TDD," R1-074196, Agenda Item: 6.2.3, 3GPP TSG RAN WG1 #50bis, Shanghai, China, Oct. 8-12, 2007, 9 pages.
Malaysian Office Action dated Jan. 31, 2013, for corresponding Malaysian Application No. PI20095659, 3 pages.
"Multiplexing Capability of CQIs and ACK/NACKs Form Different UEs," Report R1-072315, 3rd Generation Partnership Project (3GPP™) TSG RAN WG1 Meeting #49, Kobe, Japan, May 7-11, 2007, 4 pages.
Nakao et al., "Performance Improvement of Evolved UTRA Uplink Control Channel for Fast Fading Environments," Report RCS2008-61, Institute of Electronics, Information and Communication Engineers (IEICE) Technical Report 108(188):49-54, Aug. 2008.
Nakao et al., "Considerations of the Scrambling for Evolved UTRA Uplink Control Channel," Report RCS2008-112, Institute of Electronics, Information and Communication Engineers (IEICE) Technical Report 108(249):55-60, Oct. 2008.
"Necessity of the Scrambling for ACK/NACK on PUCCH," R1-080139, 3rd Generation Partnership Project (3GPP™) TSG RAN WG1 Meeting #51, Sevilla, Spain, Jan. 14-18, 2008, pp. 1-5.
"Necessity of the Scrambling for ACK/NACK on PUCCH," R1-080978, 3rd Generation Partnership Project (3GPP™) TSG RAN WG1 Meeting #52, Sorrento, Italy, Feb. 11-15, 2008, pp. 1-6.

(56) References Cited

OTHER PUBLICATIONS

"Necessity of the Scrambling for ACK/NACK on PUCCH," R1-082403, 3GPP TSG WG1 Meeting #54, Warsaw, Jun. 30-Jul. 4, 2008, 7 pages.
"Necessity of the Scrambling for the Reference Signal of CQI in PUCCH," R1-080979, 3rd Generation Partnership Project (3GPP™) TSG RAN WG1 Meeting #52, Sorrento, Italy, Feb. 11-15, 2008, pp. 1-5.
Panasonic, "Ordering of the implicit resource allocation table for Uplink ACK/NACK," R1-074412, Agenda Item: 6.2.4 Uplink Control Channel, 3GPP TSG RAN WG1 Meeting #50bis, Shanghai, China, Oct. 8-12, 2007, 4 pages.
"Proposed PUCCH Slot Format Consider S-RS Transmission," R1-073487, 3rd Generation Partnership Project (3GPP™) TSG RAN WG1 Meeting #50, Athens, Greece, Aug. 20-24, 2007, 7 pages.
"Signaling Parameters for UL ACK/NACK Resources," R1-073616, 3rd Generation Partnership Project (3GPP™) TSG RAN WG1 Meeting #50, Athens, Greece, Aug. 20-24, 2007, pp. 1-3.
"Variable Phase Definition of the Reference Signal for CQI in PUCCH," R1-073621, 3rd Generation Partnership Project (3GPP™) TSG RAN WG1 Meeting #50, Athens, Greece, Aug. 20-24, 2007, pp. 1-5.

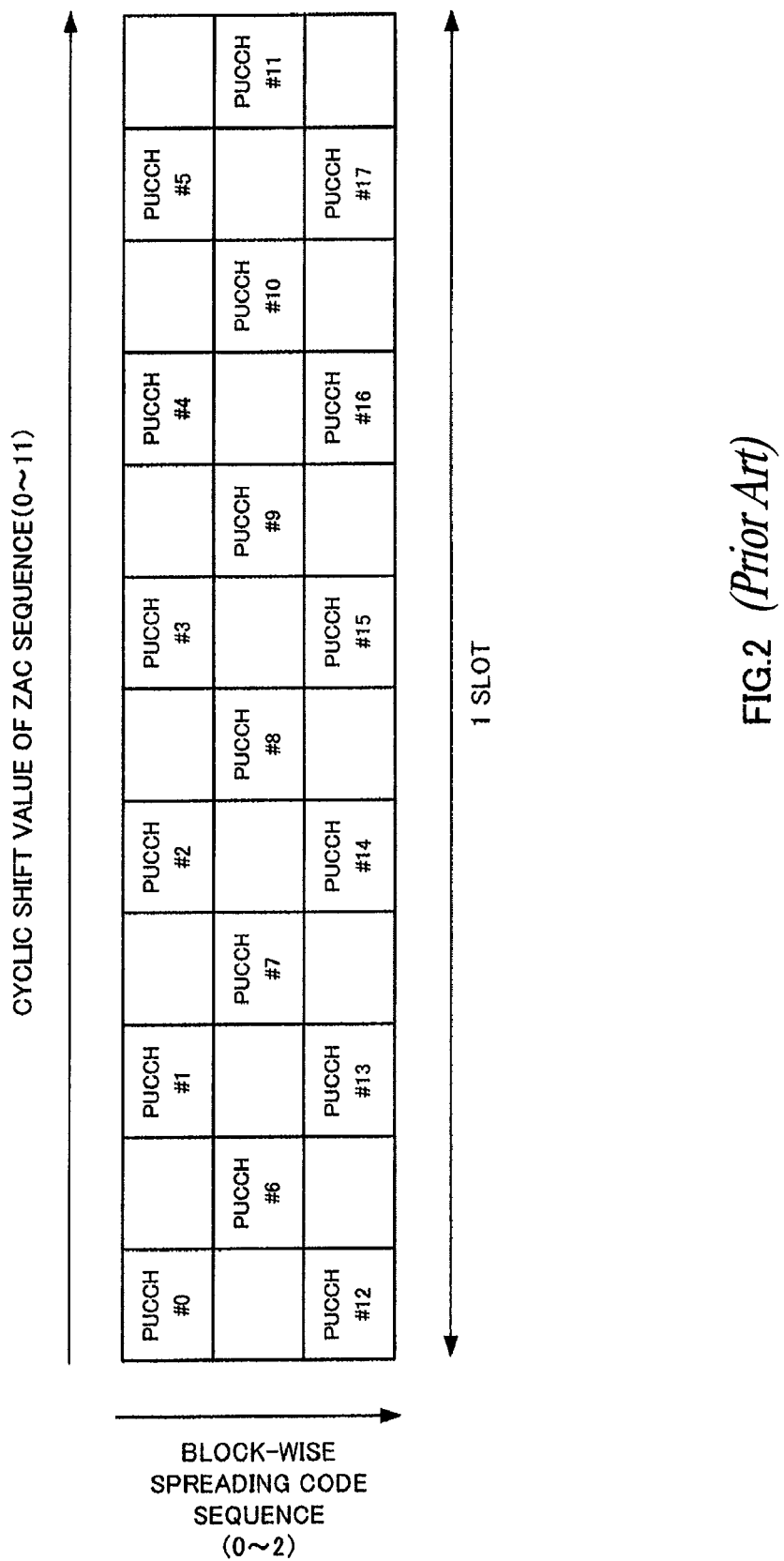
FIG.2 *(Prior Art)*

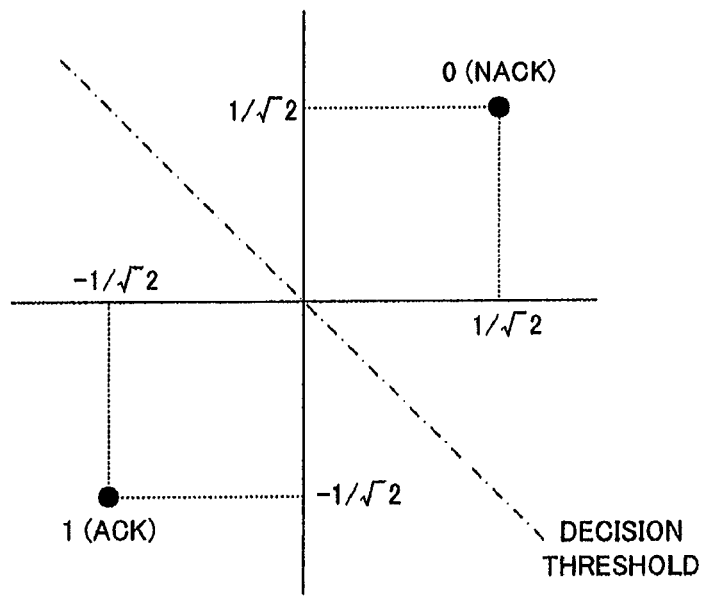
FIG.3 *(Prior Art)*
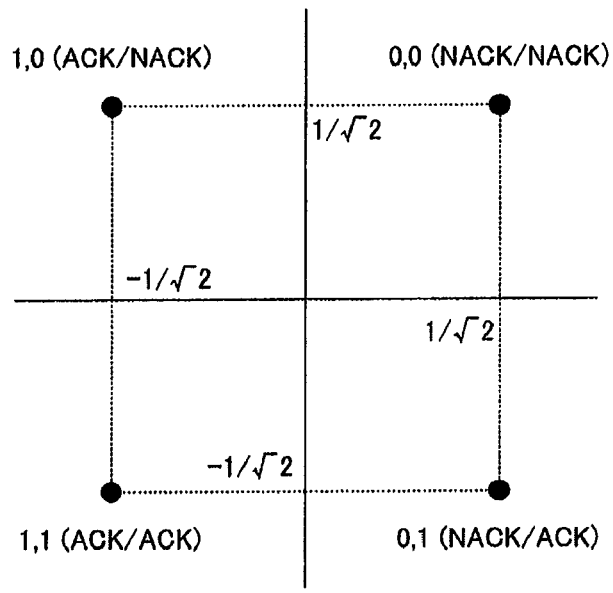
FIG.4 *(Prior Art)*

RADIO COMMUNICATION APPARATUS AND RADIO COMMUNICATION METHOD

TECHNICAL FIELD

The present invention relates to a radio communication apparatus and constellation control method.

BACKGROUND ART

In mobile communication, Automatic Repeat Request (ARQ) is applied to downlink data from a radio communication base station apparatus (hereinafter abbreviated to "base station") to radio communication mobile station apparatuses (hereinafter abbreviated to "mobile stations"). That is, mobile stations feed back response signals representing error detection results of downlink data, to the base station. Mobile stations perform a Cyclic Redundancy Check (CRC) of downlink data, and, if CRC=OK is found (i.e., if no error is found), feed back an Acknowledgement (ACK), and, if CRC=NG is found (i.e., if error is found), feed back a NACK (Negative ACKnowledgement), as a response signal to the base station. These response signals are transmitted to the base station using uplink control channels such as a Physical Uplink Control Channel (PUCCH).

Also, the base station transmits control information for carrying resource allocation results of downlink data, to mobile stations. This control information is transmitted to the mobile stations using downlink control channels such as L1/L2 Control Channels (L1/L2 CCHs). Each L1/L2 CCH occupies one or a plurality of Control Channel Elements (CCEs) based on the coding rate of control information. For example, when a L1/L2 CCH for carrying control information coded by a rate of ⅔ occupies one CCE, a L1/L2 CCH for carrying control information coded by a rate of ⅓ occupies two CCEs, a L1/L2 CCH for carrying control information coded by a rate of ⅙ occupies four CCEs and a L1/L2 CCH for carrying control information coded by a rate of 1/12 occupies eight CCEs. Also, when one L1/L2 occupies a plurality of CCEs, the CCEs occupied by the L1/L2 CCH are consecutive. The base station generates a L1/L2 CCH on a per mobile station basis, assigns CCEs to be occupied by L1/L2 CCH's based on the number of CCEs required by control information, and maps the control information on physical resources corresponding to the assigned CCEs and transmits the control information.

Also, studies are underway to map between CCEs and PUCCHs on a one-to-one basis, to use downlink communication resources efficiently without signaling from a base station to mobile stations to report the PUCCHs to be used for transmission of response signals, (see Non-Patent Document 1). According to this mapping, each mobile station can decide the PUCCH to use to transmit response signals from the mobile station, from the CCEs corresponding to physical resources on which control information for the mobile station is mapped. Therefore, each mobile station maps a response signal from the mobile station on a physical resource, based on the CCE corresponding to a physical resource on which control information directed to the mobile station is mapped. For example, when a CCE corresponding to a physical resource on which control information directed to the mobile station is mapped, is CCE #0, the mobile station decides PUCCH #0 associated with CCE #0 as the PUCCH for the mobile station. Also, for example, when CCEs corresponding to physical resources on which control information directed to the mobile station is mapped are CCE #0 to CCE #3, the mobile station decides PUCCH #0 associated with CCE #0, which is the smallest number in CCE #0 to CCE #3, as the PUCCH for the mobile station, and, when CCEs corresponding to physical resources on which control information directed to the mobile station is mapped are CCE #4 to CCE #7, the mobile station decides PUCCH #4 associated with CCE #4, which is the smallest number in CCE #4 to CCE #7, as the PUCCH for the mobile station.

Also, as shown in FIG. 1, studies are underway to perform code-multiplexing by spreading a plurality of response signals from a plurality of mobile stations using Zero Auto Correlation (ZAC) sequences and Walsh sequences (see Non-Patent Document 1). In FIG. 1, [$W_0, W_1, W_2, W_3$] represents a Walsh sequence with a sequence length of 4. As shown in FIG. 1, in a mobile station, first, a response signal of ACK or NACK is subject to first spreading to one symbol by a ZAC sequence (with a sequence length of 12) in the frequency domain. Next, the response signal subjected to first spreading is subject to an IFFT (Inverse Fast Fourier Transform) in association with $W_0$ to $W_3$. The response signal spread in the frequency domain by a ZAC sequence with a sequence length of 12 is transformed to a ZAC sequence with a sequence length of 12 by this IFFT in the time domain. Then, the signal subjected to the IFFT is subject to second spreading using a Walsh sequence (with a sequence length of 4). That is, one response signal is allocated to each of four SC-FDMA (Single Carrier-Frequency Division Multiple Access) symbols $S_0$ to $S_3$. Similarly, response signals of other mobile stations are spread using ZAC sequences and Walsh sequences. Here, different mobile stations use ZAC sequences of different cyclic shift values in the time domain (i.e., in the cyclic shift axis) or different Walsh sequences. Here, the sequence length of ZAC sequences in the time domain is 12, so that it is possible to use twelve ZAC sequences of cyclic shift values "0" to "11," generated from the same ZAC sequence. Also, the sequence length of Walsh sequences is 4, so that it is possible to use four different Walsh sequences. Therefore, in an ideal communication environment, it is possible to code-multiplex maximum forty-eight (12×4) response signals from mobile stations.

Also, as shown in FIG. 1, studies are underway for code-multiplexing a plurality of reference signals (e.g., pilot signals) from a plurality of mobile stations (see Non-Patent Document 2). As shown in FIG. 1, in the case of generating three symbols of reference signals $R_0$, $R_1$ and $R_2$, similar to the case of response signals, first, the reference signals are subject to first spreading in the frequency domain by a sequence having characteristics of a ZAC sequence (with a sequence length of 12) in the time domain. Next, the reference signals subjected to first spreading are subject to an IFFT in association with orthogonal sequences with a sequence length of 3, [$F_0, F_1, F_2$] such as a Fourier sequence. The reference signals spread in the frequency domain are converted by this IFFT to ZAC sequences with a sequence length of 12 in the time domain. Further, these signals subjected to IFFT are subject to second spreading using orthogonal sequences [$F_0, F_1, F_2$.] That is, one reference signal is allocated to three SC-FDMA symbols $R_0$, $R_1$ and $R_2$. Similarly, other mobile stations allocate one reference signal to three symbols $R_0$, $R_1$ and $R_2$. Here, different mobile stations use ZAC sequences of different cyclic shift values in the time domain or different orthogonal sequences. Here, the sequence length of ZAC sequences in the time domain is 12, so that it is possible to use twelve ZAC sequences of cyclic shift values "0" to "11," generated from the same ZAC sequence. Also, the sequence length of an orthogonal sequence is 3, so that it is possible to use three different orthogonal sequences. Therefore, in an ideal communication environment, it is possible to code-multiplex maximum thirty-six (12×3) reference signals from mobile stations.

As shown in FIG. 1, seven symbols of $S_0$, $S_1$, $R_0$, $R_1$, $R_2$, $S_2$ and $S_3$ form one symbol.

Here, there is substantially no cross correlation between ZAC sequences of different cyclic shift values generated from the same ZAC sequence. Therefore, in an ideal communication environment, a plurality of response signals subjected to spreading and code-multiplexing by ZAC sequences of different cyclic shift values (0 to 11), can be separated in the time domain substantially without inter-code interference, by correlation processing in the base station.

However, due to an influence of, for example, transmission timing difference in mobile stations and multipath delayed waves, a plurality of response signals from a plurality of mobile stations do not always arrive at a base station at the same time. For example, if the transmission timing of a response signal spread by the ZAC sequence of cyclic shift value "0" is delayed from the correct transmission timing, the correlation peak of the ZAC sequence of cyclic shift value "0" may appear in the detection window the ZAC sequence of cyclic shift value "1."

Further, if a response signal spread by the ZAC sequence of cyclic shift value "0" has a delay wave, an interference leakage due to the delayed wave may appear in the detection window for the ZAC sequence of cyclic shift value "1." That is, in these cases, the ZAC sequence of cyclic shift value "1" is interfered with by the ZAC sequence of cyclic shift value "0." On the other hand, if the transmission timing of a response signal spread by the ZAC sequence of cyclic shift value "1" is earlier than the correct transmission timing, the correlation peak of the ZAC sequence of cyclic shift value "1" may appear in the detection window for the ZAC sequence of cyclic shift value "0." That is, in this case, the ZAC sequence of cyclic shift value "0" is interfered with by the ZAC sequence of cyclic shift value "1." Therefore, in these cases, the separation performance degrades between a response signal spread by the ZAC sequence of cyclic shift value "0" and a response signal spread by the ZAC sequence of cyclic shift value "1." That is, if ZAC sequences of adjacent cyclic shift values are used, the separation performance of response signals may degrade.

Therefore, up till now, if a plurality of response signals are code-multiplexed by spreading using ZAC sequences, a sufficient cyclic shift value difference (i.e., cyclic shift interval) is provided between the ZAC sequences, to an extent that does not cause inter-code interference between the ZAC sequences. For example, when the difference between cyclic shift values of ZAC sequences is 2, only six ZAC sequences of cyclic shift values "0," "2," "4," "6," "8" and "10" or cyclic shift values "1," "3," "5," "7," "9" and "11" amongst twelve ZAC sequences of cyclic shift values "0" to "12," are used for first spreading of response signals. Therefore, if a Walsh sequence with a sequence length of 4 is used for second spreading of response signals, it is possible to code-multiplex maximum twenty-four (6×4) response signals from mobile stations.

However, as shown in FIG. 1, the sequence length of an orthogonal sequence used to spread reference signals is 3, and therefore only three different orthogonal sequences can be used to spread reference signals. Consequently, when a plurality of response signals are separated using the reference signals shown in FIG. 1, only maximum eighteen (6×3) response signals from mobile stations can be code-multiplexed. That is, three Walsh sequences are required amongst four Walsh sequences with a sequence length of 4, and therefore one Walsh sequence is not used.

Also, the 1 SC-FDMA symbol shown in FIG. 1 may be referred to as "1 LB (Long Block)." Therefore, a spreading code sequence that is used in spreading in symbol units or LB units, is referred to as a "block-wise spreading code sequence."

Also, studies are underway to define eighteen PUCCHs as shown in FIG. 2. Normally, the orthogonality of response signals does not collapse between mobile stations using different block-wise spreading code sequences, as long as the mobile stations do not move fast. But, especially if there is a large difference of received power between response signals from a plurality of mobile stations at a base station, one response signal may be interfered with by another response signal between mobile stations using the same block-wise spreading code sequence. For example, in FIG. 2, a response signal using PUCCH #1 (cyclic shift value=2) may be interfered with by a response signal using PUCCH #0 (cyclic shift value=0).

Also, studies are underway to use the constellation shown in FIG. 3 when BPSK is used as the modulation scheme for response signals, and the constellation shown in FIG. 4 when QPSK is used as the modulation scheme for response signals (see Non-Patent Document 3).

Non-Patent Document 1: NTT DoCoMo, Fujitsu, Mitsubishi Electric, "Implicit Resource Allocation of ACK/NACK Signal in E-UTRA Uplink," 3GPP TSG RAN WG1 Meeting #49, R1-072439, Kobe, Japan, May 7-11, 2007.

Non-Patent Document 2: Nokia Siemens Networks, Nokia, "Multiplexing capability of CQIs and ACK/NACKs form different UEs," 3GPP TSG RAN WG1 Meeting #49, R1-072315, Kobe, Japan, May 7-11, 2007.

Non-Patent Document 3: 3GPP; TSG RAN, *Evolved Universal Terrestrial Radio Access (E-UTRA)*; "Physical Channels and Modulation (Release 8)," 3GPP TS 36.211 V8.0.0, September 2007.

DISCLOSURE OF INVENTION

Problems to be Solved by the Invention

An example case will be described below where the constellation shown in FIG. 3 is used to modulate a response signal. Also, an example case will be described below where one mobile station #1 transmits a response signal using PUCCH #1 (in FIG. 2) and another mobile station #2 transmits a response signal using PUCCH #0 (in FIG. 2).

In this case, the base station performs the above-described correlation processing to distinguish between the response signal from mobile station #1 and the response signal from mobile station #2. At this time, components of the response signal from mobile station #2 may leak in the correlation output to receive the response signal of mobile station #1, and interfere with the response signal of mobile station #1.

Then, when mobile station #1 and mobile station #2 both transmit an ACK and the base station receives the response signal from mobile station #1, interference given from the response signal of mobile station #2 to the response signal of mobile station #1 is as follows.

That is, when the ACK and reference signal transmitted from mobile station #1 are received by the base station via a channel, in the base station, a response signal represented by $(-1-j)\,h1/\sqrt{2}$ and reference signal represented by $(1+j)\,h1/\sqrt{2}$ are found as a correlation output of mobile station #1. Here, h1 is an effective channel in a case where the signals from mobile station #1 pass a channel between mobile station #1 and the base station, and are found, as a correlation output, in the detection window for mobile station #1 in the base station.

Also, when the ACK and reference signal transmitted from mobile station #2 are received by the base station via a channel, in the base station, a component represented by $(-1-j)$ $h2/\sqrt{2}$ is found as interference to the response signal of mobile station #1 and a component represented by $(1+j)$ $h2/\sqrt{2}$ is found as interference to the reference signal of mobile station #1 in the correlation output of mobile station #1. Here, h2 is an effective channel in a case where the signals from mobile station #2 passes a channel between mobile station #2 and the base station, and leak, as the correlation output, in the detection window for mobile station #1 in the base station.

When there is little delay on a channel and no transmission timing difference at a mobile station, such a leak does not occur. But, depending on conditions, h2 may be non-negligibly high for h1. Therefore, when an ACK from mobile station #1 and ACK from mobile station #2 are code-multiplexed, in the base station, a response signal represented by $(-1-j)(h1+h2)/\sqrt{2}$ and reference signal represented by $(1+j)(h1+h2)/\sqrt{2}$ are found in the correlation output of mobile station #1.

Therefore, the interference component given from the ACK of mobile station #2 to the ACK of mobile station #1 (i.e., the Euclidean distance from $(-1-j)/\sqrt{2}$) by the synchronous detection in the base station, is represented by equation 1. That is, when both mobile station #1 and mobile station #2 transmit an ACK, there is no inter-code interference between the ACK of mobile station #1 and the ACK of mobile station #2.

[1]

$$\frac{(1+j)}{\sqrt{2}}\left(-1-\frac{-h_1-h_2}{h_1+h_2}\right)=0 \quad \text{(Equation 1)}$$

Also, when mobile station #1 transmits a NACK, mobile station #2 transmits an ACK and the base station receives the response signal from mobile station #1, interference from the response signal of mobile station #2 to the response signal #1 is as follows.

That is, when the NACK and reference signal transmitted from mobile station #1 are received by the base station via a channel, in the base station, a response signal represented by $(1+j)h1/\sqrt{2}$ and reference signal represented by $(1+j)h1/\sqrt{2}$ are found as a correlation output of mobile station #1.

Also, when the ACK and reference signal transmitted from mobile station #2 are received by the base station via a channel, in the base station, a component represented by $(-1-h2/\sqrt{2})$ is found as interference to the response signal of mobile station #1 and a component represented by $(1+j)h2/\sqrt{2}$ is found as interference to the reference signal of mobile station #1 in the correlation output of mobile station #1.

Therefore, when the NACK from mobile station #1 and the ACK from mobile station #2 are code-multiplexed, in the base station, a response signal represented by $(1+j)(h1-h2)/\sqrt{2}$ and reference signal represented by $(1+j)(h1+h2)/\sqrt{2}$ are found in the correlation output of mobile station #1.

Therefore, the interference component given from the ACK of mobile station #2 to the NACK of mobile station #1 (i.e., the Euclidean distance from $(1+j)/\sqrt{2}$) by the synchronous detection in the base station, is represented by equation 2. That is, when mobile station #1 transmits a NACK and mobile station #2 transmits an ACK, significant inter-code interference may be given from the ACK of mobile station #2 to the NACK of mobile station #1.

[2]

$$\frac{(1+j)}{\sqrt{2}}\left(1-\frac{h_1-h_2}{h_1+h_2}\right)=\frac{(1+j)}{\sqrt{2}}\left(\frac{2h_2}{h_1+h_2}\right) \quad \text{(Equation 2)}$$

Similarly, when mobile station #1 and mobile station #2 both transmit a NACK signal, as shown in equation 3, inter-code interference does not occur between the NACK of mobile station #1 and the NACK of mobile station #2. Also, when mobile station #1 transmits an ACK and mobile station #2 transmits a NACK, as shown in equation 4, significant inter-code interference may be given from the NACK of mobile station #2 to the ACK of mobile station #1.

[3]

$$\frac{(1+j)}{\sqrt{2}}\left(1-\frac{h_1+h_2}{h_1+h_2}\right)=0 \quad \text{(Equation 3)}$$

[4]

$$\frac{(1+j)}{\sqrt{2}}\left(-1-\frac{-h_1+h_2}{h_1+h_2}\right)=\frac{(1+j)}{\sqrt{2}}\left(\frac{-2h_2}{h_1+h_2}\right) \quad \text{(Equation 4)}$$

Here, taking into account that ARQ is applied to downlink data, 3GPP-LTE defines that the target error rate per downlink data transmission is around 1 to 10%. That is, in ARQ of downlink data, the ACK occurrence rate is significantly higher than the NACK occurrence rate. For example, in a mobile communication system in which the target error rate per downlink data transmission is set to 10%, the ACK occurrence rate is 90%, while the NACK occurrence rate is 10%. Therefore, in the above example, there is a high possibility that a response signal of mobile station #2 that interferes with a response signal of mobile station #1 is an ACK. That is, there is a high possibility that, when mobile station #1 transmits a NACK, significant inter-code interference (represented by equation 2) is given from a response signal of mobile station #2 to this NACK, while there is a low possibility that, when mobile station #1 transmits an ACK, significant inter-code interference (represented by equation 4) is given from a response signal of mobile station #2 to this ACK. That is, there is a possibility that a NACK is more influenced by interference than an ACK. Consequently, the possibility of an increased error rate by interference becomes larger in a NACK than an ACK. Therefore, up till now, there is a possibility that a large difference is produced between NACK received quality and ACK received quality and a NACK is received in much poorer quality than an ACK.

In view of the above, it is therefore an object of the present invention to provide a radio communication apparatus and constellation control method that can make ACK received quality and NACK received quality equal.

Means for Solving the Problem

The radio communication apparatus of the present invention employs a configuration having: a first spreading section that performs first spreading of a response signal using one of a plurality of first sequences that can be separated from each other because of different cyclic shift values; a second spreading section that performs second spreading of the response signal subjected to the first spreading using one of a plurality of second sequences that are orthogonal to each other; and a rotating section that, with reference to a first constellation of a first response signal group formed with response signals subject to the first spreading by a part of the plurality of first sequences, rotates a second constellation of a second response signal group formed with response signals subject to the first spreading by other first sequences than the part of the plurality of first sequences, by ninety degrees.

The constellation control method of the present invention includes: a first spreading step of performing first spreading of a response signal using one of a plurality of first sequences that can be separated from each other because of different cyclic shift values; a second spreading step of performing second spreading of the response signal subjected to the first spreading using one of a plurality of second sequences that are orthogonal to each other; and a rotating step of, with reference to a first constellation of a first response signal group formed with response signals subject to the first spreading by a part of the plurality of first sequences, rotating a second constellation of a second response signal group formed with response signals subject to the first spreading by other first sequences than the part of the plurality of first sequences, by ninety degrees.

Advantageous Effect of Invention

According to the present invention, it is possible to make ACK received quality and NACK received quality equal.

BRIEF DESCRIPTION OF DRAWINGS

FIG. 2 is a diagram showing the definition of PUCCH (prior art);
FIG. 3 illustrates a BPSK constellation (prior art);
FIG. 4 illustrates a QPSK constellation (prior art)

BEST MODE FOR CARRYING OUT THE INVENTION

Embodiments of the present invention will be explained below in detail with reference to the accompanying drawings.

Embodiment 1

Figure 1:
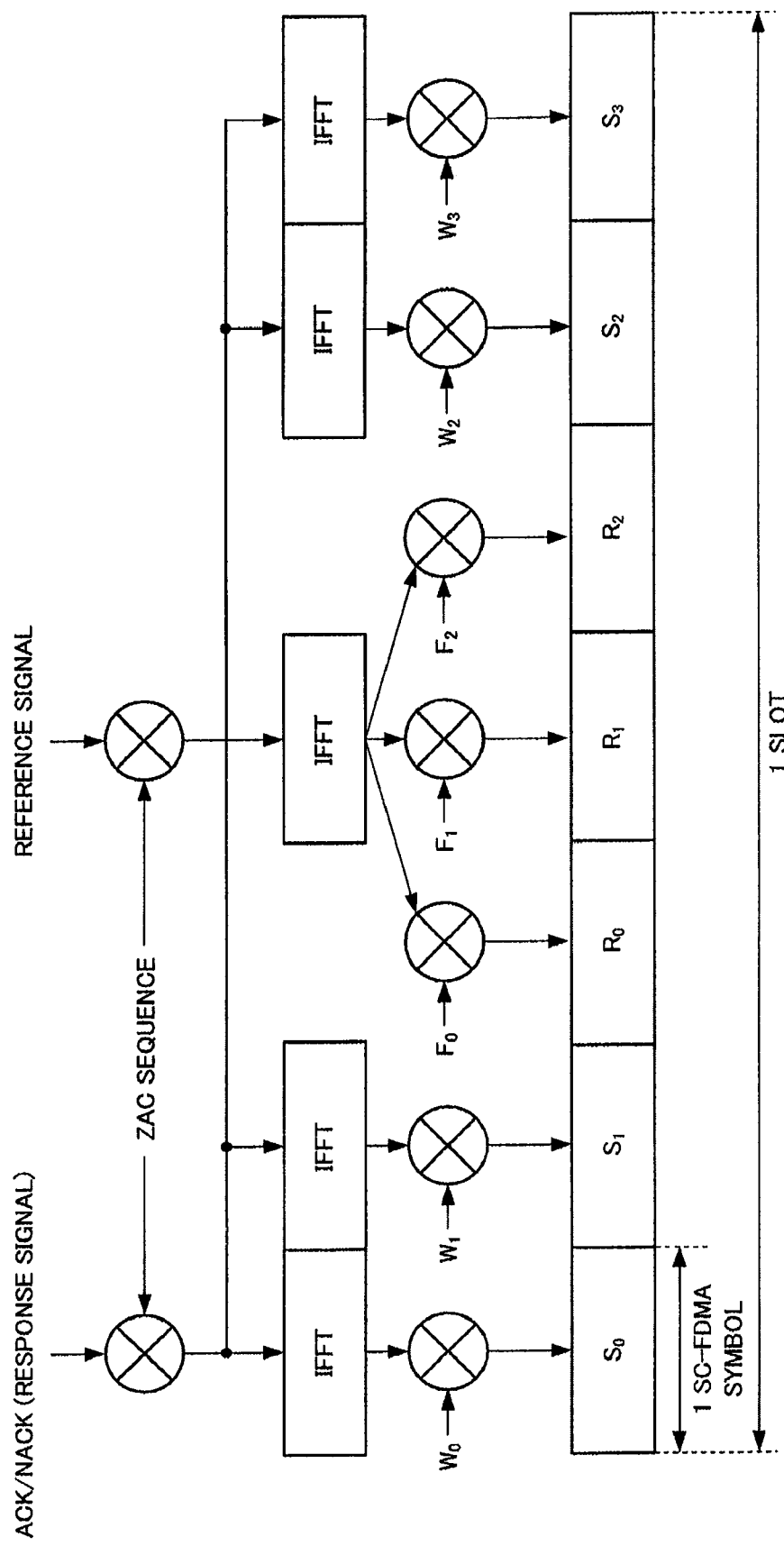
FIG. 1 is a diagram showing a spreading method of a response signal and reference signal (prior art)
Figure 5:
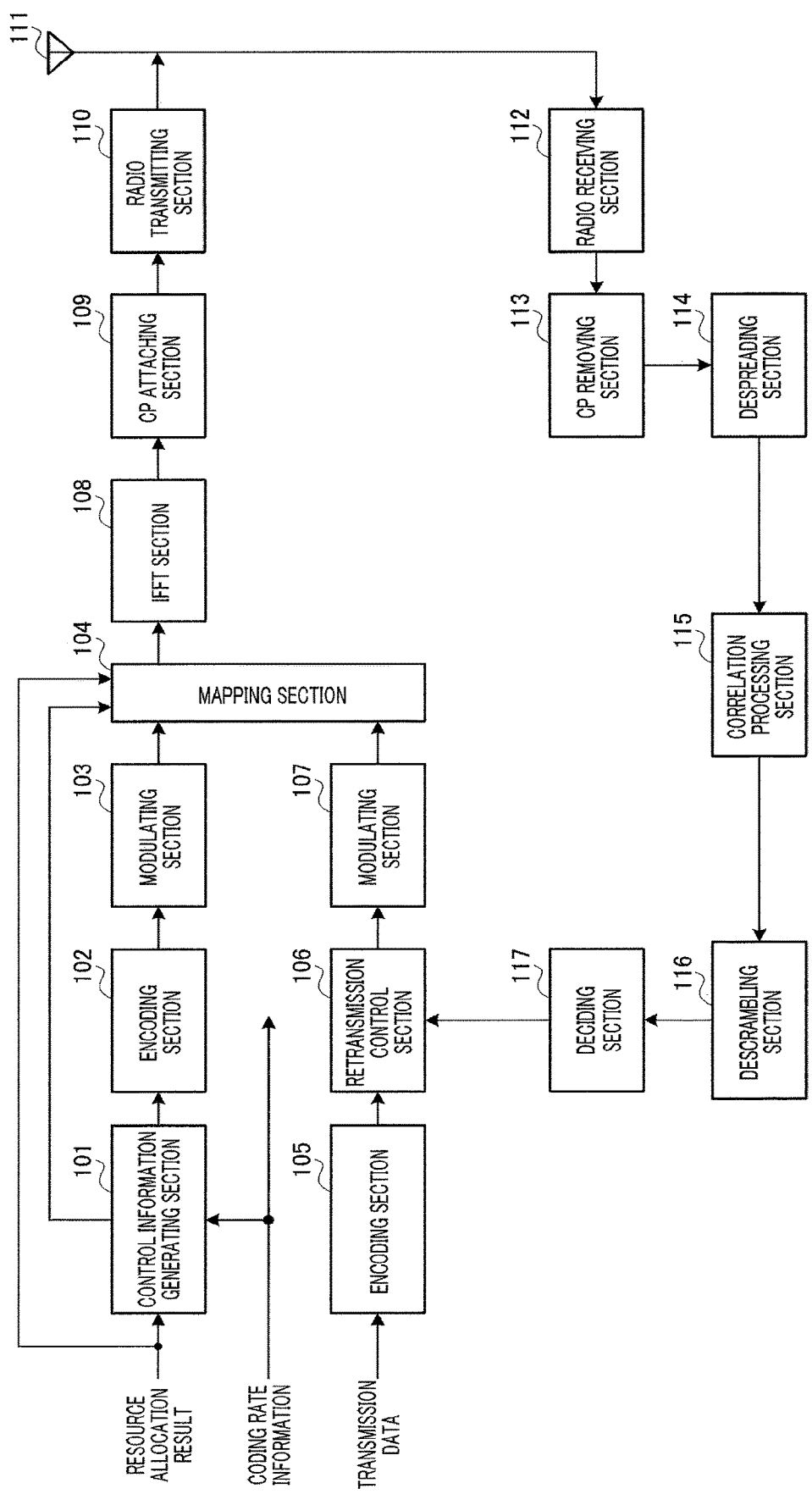
FIG. 5 is a block diagram showing the configuration of a base station according to Embodiment 1 of the present invention.
Figure 6:
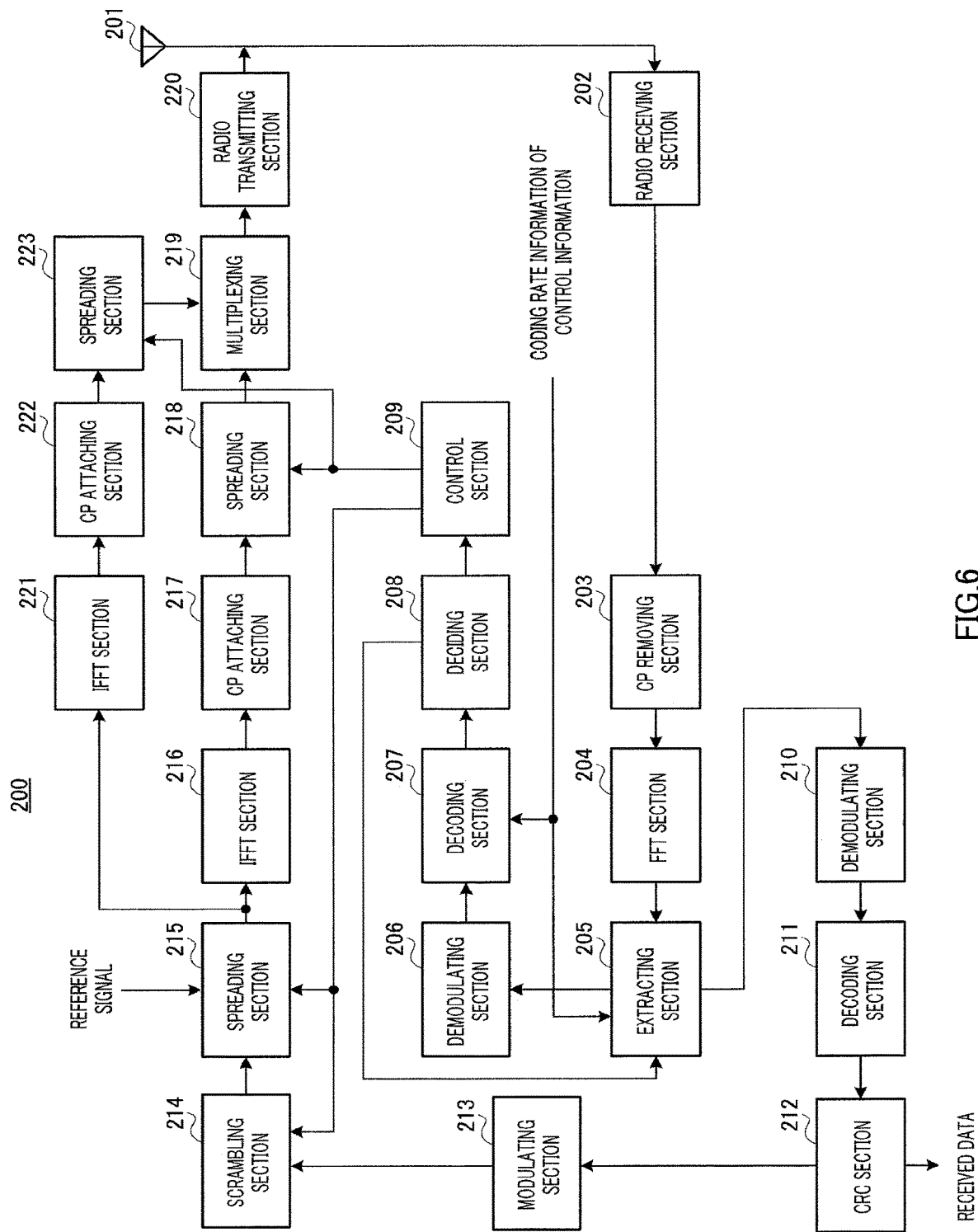
FIG. 6 is a block diagram showing the configuration of a mobile station according to Embodiment 1 of the present invention.

FIG. 5 illustrates the configuration of base station 100 according to the present invention, and FIG. 6 illustrates the configuration of mobile station 200 according to the present embodiment.

Here, to avoid complicated explanation, FIG. 5 illustrates components associated with transmission of downlink data and components associated with reception of uplink response signals to downlink data, which are closely related to the present invention, and illustration and explanation of the components associated with reception of uplink data will be omitted. Similarly, FIG. 6 illustrates components associated with reception of downlink data and components associated with transmission of uplink response signals to downlink data, which are closely related to the present invention, and illustration and explanation of the components associated with transmission of uplink data will be omitted.

Also, a case will be described with the following explanation, where ZAC sequences are used for first spreading and block-wise spreading code sequences are used for second spreading. Here, for first spreading, it is equally possible to use sequences, which can be separated from each other because of different cyclic shift values, other than ZAC sequences. For example, for first spreading, it is possible to use a GCL (Generated Chip like) sequence, CAZAC (Constant Amplitude Zero Auto Correlation) sequence, ZC (Zad-off-Chu) sequence or PN sequence such as a M sequence and orthogonal Gold code sequence. Also, as block-wise spreading code sequences for second spreading, it is possible to use any sequences as long as these sequences are orthogonal or substantially orthogonal to each other. For example, it is possible to use Walsh sequences or Fourier sequences as block-wise spreading code sequences for second spreading.

Also, in the following explanation, twelve ZAC sequences with sequence length of 12 and of cyclic shift values "0" to "11" are referred to as "ZAC #0" to "ZAC

11," and three block-wise spreading code sequences with a sequence length of 4 and of sequence numbers "0" to "2" are referred to as "BW #0" to "BW #3." Here, the present invention is not limited to these sequence lengths.

Also, in the following explanation, the PUCCH numbers are determined by the cyclic shift values of ZAC sequences and the sequence numbers of block-wise spreading code sequences. That is, a plurality of resources for response signals are determined by ZAC #0 to ZAC #11, which can be separated from each other because of different cyclic shift values, and BW #0 to BW #2, which are orthogonal to each other.

Also, in the following explanation, the CCE numbers and the PUCCH numbers are associated on a one-to-one basis. That is, CCE #0 is mapped to PUCCH #π0, CCE #1 is mapped to PUCCH #1, CCE #2 is mapped to PUCCH #2 . . . , and so on.

In base station 100 shown in FIG. 5, control information generating section 101 and mapping section 104 receive as input a resource allocation result of downlink data. Also, control information generating section 101 and encoding section 102 receives as input a coding rate of control information to report the resource allocation result of downlink data, on a per mobile station basis, as coding rate information. Here, in the same way as above, the coding rate of the control information is one of $2/3, 1/3, 1/6$ or $1/12$.

Control information generating section 101 generates control information to carry the resource allocation result, on a per mobile station basis, and outputs the control information to encoding section 102. Control information, which is provided per mobile station, includes mobile station ID information to indicate to which mobile station the control information is directed. For example, control information includes, as mobile station ID information, CRC bits masked by the ID number of the mobile station, to which control information is reported. Further, according to the coding rate information received as input, control information generating section 101 allocates a L1/L2 CCH to each mobile station based on the number of CCEs required to report the control information, and outputs the CCE number corresponding to the allocated L1/L2 CCH to mapping section 104. Here, in the same way as above, a L1/L2 CCH occupies one CCE when the coding rate of control information is $2/3$. Therefore, a L1/L2 CCH occupies two CCEs when the coding rate of control information is $1/3$, a L1/L2 CCH occupies four CCEs when the coding rate of control information is $1/6$, and a L1/L2 CCH occupies eight CCEs when the coding rate of control information is $1/12$. Also, in the same way as above, when one L1/L2 CCH occupies a plurality of CCEs, the CCEs occupied by the L1/L2 CCH are consecutive.

Encoding section 102 encodes control information on a per mobile station basis according to the coding rate information received as input, and outputs the encoded control information to modulating section 103.

Modulating section 103 modulates the encoded control information and outputs the result to mapping section 104.

On the other hand, encoding section 105 encodes the transmission data for each mobile station (i.e., downlink data) and outputs the encoded transmission data to retransmission control section 106.

Upon initial transmission, retransmission control section 106 holds the encoded transmission data on a per mobile station basis and outputs the data to modulating section 107. Retransmission control section 106 holds transmission data until retransmission control section 106 receives as input an ACK of each mobile station from deciding section 117.

Further, upon receiving as input a NACK of each mobile station from deciding section 117, that is, upon retransmission, retransmission control section 106 outputs the transmission data associated with that NACK to modulating section 107.

Modulating section 107 modulates the encoded transmission data received as input from retransmission control section 106, and outputs the result to mapping section 104.

Upon transmission of control information, mapping section 104 maps the control information received as input from modulating section 103 on a physical resource based on the CCE number received as input from control information generating section 101, and outputs the result to IFFT section 108. That is, mapping section 104 maps control information on the subcarrier corresponding to the CCE number in a plurality of subcarriers comprised of an orthogonal frequency division multiplexing (OFDM) symbol, on a per mobile station basis.

On the other hand, upon transmission of downlink data, mapping section 104 maps the transmission data, which is provided on a per mobile station basis, on a physical resource based on the resource allocation result, and outputs the result to IFFT section 108. That is, based on the resource allocation result, mapping section 104 maps transmission data on a subcarrier in a plurality of subcarriers comprised of an OFDM symbol, on a per mobile station basis.

IFFT section 108 generates an OFDM symbol by performing an IFFT of a plurality of subcarriers on which control information or transmission data is mapped, and outputs the OFDM symbol to CP (Cyclic Prefix) attaching section 109.

CP attaching section 109 attaches the same signal as the signal at the tail end part of the OFDM symbol, to the head of the OFDM symbol as a CP.

Radio transmitting section 110 performs transmission processing such as digital-to-analog (D/A) conversion, amplification and up-conversion on the OFDM symbol with a CP and transmits the result from antenna 111 to mobile station 200 (in FIG. 6).

On the other hand, radio receiving section 112 receives a response signal or reference signal transmitted from mobile station 200 (in FIG. 6), via antenna 111, and performs receiving processing such as down-conversion and analog-to-digital (A/D) conversion on the response signal or reference signal.

CP removing section 113 removes the CP attached to the response signal or reference signal subjected to receiving processing.

Despreading section 114 despreads the response signal by a block-wise spreading code sequence that is used for second spreading in mobile station 200, and outputs the despread response signal to correlation processing section 115. Similarly, despreading section 114 despreads the reference signal by an orthogonal sequence that is used to spread the reference signal in mobile station 200, and outputs the despread reference signal to correlation processing section 115.

Correlation processing section 115 finds the correlation value between the spread response signal, spread reference signal and ZAC sequence that is used for first spreading in mobile station 200, and outputs the correlation value to descrambling section 116.

Descrambling section 116 descrambles the correlation value by the scrambling code associated with the cyclic shift value of the ZAC sequence, and outputs the descrambled correlation value to deciding section 117.

Deciding section 117 detects a response signal on a per mobile station basis, by detecting a correlation peak on a per mobile station basis using detection windows. For example, upon detecting a correlation peak in the detection window for mobile station #1, deciding section 117 detects a response signal from mobile station #1. Then, deciding section 117 decides whether the detected response signal is an ACK or NACK by the synchronous detection using the correlation value of the reference signal, and outputs the ACK or NACK to retransmission control section 106 on a per mobile station basis.

On the other hand, in mobile station 200 shown in FIG. 6, radio receiving section 202 receives the OFDM symbol transmitted from base station 100 (in FIG. 5), via antenna 201, and performs receiving processing such as down-conversion and A/D conversion on the OFDM symbol.

CP removing section 203 removes the CP attached to the OFDM symbol subjected to receiving processing.

FFT (Fast Fourier Transform) section 204 acquires control information or downlink data mapped on a plurality of subcarriers by performing a FFT of the OFDM symbol, and outputs the control information or downlink data to extracting section 205.

Extracting section and decoding section 207 receives as input coding rate information indicating the coding rate of the control information, that is, information indicating the number of CCEs occupied by a L1/L2 CCH.

Upon reception of the control information, based on the coding rate information, extracting section extracts the control information from the plurality of subcarriers and outputs it to demodulating section 206.

Demodulating section 206 demodulates the control information and outputs the demodulated control information to decoding section 207.

Decoding section 207 decodes the control information based on the coding rate information received as input, and outputs the decoded control information to deciding section 208.

On the other hand, upon receiving the downlink data, extracting section extracts the downlink data directed to the mobile station from the plurality of subcarriers, based on the resource allocation result received as input from deciding section 208, and outputs the downlink data to demodulating section 210. This downlink data is demodulated in demodulating section 210, decoded in decoding section 211 and received as input in CRC section 212.

CRC section 212 performs an error detection of the decoded downlink data using a CRC, generates an ACK in the case of CRC=OK (i.e., when no error is found) and a NACK in the case of CRC=NG (i.e., when error is found), as a response signal, and outputs the generated response signal to modulating section 213. Further, in the case of CRC=OK (i.e., when no error is found), CRC section 212 outputs the decoded downlink data as received data.

Deciding section 208 performs a blind detection of whether or not the control information received as input from decoding section 207 is directed to the mobile station. For example, deciding section 208 decides that, if CRC=OK is found (i.e., if no error is found) as a result of demasking by the ID number of the mobile station, the control information is directed to the mobile station. Further, deciding section 208 outputs the control information for the mobile station, that is, the resource allocation result of downlink data for the mobile station, to extracting section 205.

Further, deciding section 208 decides a PUCCH to use to transmit a response signal from the mobile station, from the CCE number associated with subcarriers on which the control information directed to the mobile station is mapped, and outputs the decision result (i.e., PUCCH number) to control section 209. For example, in the same way as above, when the CCE corresponding to subcarriers, on which control information directed to the mobile station is mapped, is CCE #0, deciding section 208 decides PUCCH #0 associated with CCE #0 as the PUCCH for the mobile station. Also, for example, when CCEs corresponding to subcarriers on which control information directed to the mobile station is mapped are CCE #0 to CCE #3, deciding section 208 decides PUCCH #0 associated with CCE #0, which is the smallest number in CCE #0 to CCE #3, as the PUCCH for the mobile station, and, when CCEs corresponding to subcarriers on which control information directed to the mobile station is mapped are CCE #4 to CCE #7, deciding section 208 decides PUCCH #4 associated with CCE #4, which is the smallest number in CCE #0 to CCE #3, as the PUCCH for the mobile station. Based on the PUCCH number received as input from deciding section 208, control section 209 controls the cyclic shift value of a ZAC sequence that is used for first spreading in spreading section 215 and a block-wise spreading code sequence that is used for second spreading in spreading section 218. That is, control section 209 selects a ZAC sequence of the cyclic shift value corresponding to the PUCCH number received as input from deciding section 208, amongst ZAC #0 to ZAC #11, and sets the selected ZAC sequence in spreading section 215, and selects the block-wise spreading code sequence corresponding to the PUCCH number received as input from deciding section 208, amongst BW #0 to BW #2, and sets the selected block-wise spreading code sequence in spreading section 218. That is, control section 209 selects one of a plurality of resources defined by ZAC #0 to ZAC #11 and BW #0 to BW #2. Also, control section 209 reports the selected ZAC sequence to scrambling section 214.

Further, control section 209 controls a block-wise spreading code sequence that is used for second spreading in spreading section 223. That is, control section 209 sets the block-wise spreading code sequence corresponding to the PUCCH number received as input from deciding section 208, in spreading section 223.

Modulating section 213 modulates the response signal received as input from CRC section 212 and outputs the result to scrambling section 214. Modulation processing in modulating section 213 will be described later in detail.

Scrambling section 214 multiplies the modulated response signal (i.e., response symbol) by a scrambling code "1" or "$e^{-j(\pi/2)}$" depending on to the ZAC sequence selected in control section 209, and outputs the response signal multiplied by the scrambling code to spreading section 215. Here, by multiplication of the scrambling code "$e^{-j(\pi/2)}$," the constellation of the response signal is rotated by −90 degrees. Thus, scrambling section 214 functions as a rotation means to rotate the constellation of a response signal. Scrambling processing in scrambling section 214 will be described later in detail.

Spreading section 215 performs first spreading of the response signal and reference signal (i.e., reference symbol) by the ZAC sequence set in control section 209, and outputs the response signal subjected to first spreading to IFFT section 216 and the reference signal subjected to first spreading to IFFT section 221.

IFFT section 216 performs an IFFT of the response signal subjected to first spreading, and outputs the response signal subjected to IFFT to CP attaching section 217. CP attaching section 217 attaches the same signal as the signal at the tail end part of the response signal subjected to an IFFT, to the head of the response signal as a CP.

Spreading section 218 performs second spreading of the response signal with a CP by the block-wise spreading code sequence set in control section 209, and outputs the response signal subjected to second spreading, to multiplexing section 219. IFFT section 221 performs an IFFT of the reference signal subjected to first spreading, and outputs the reference signal subjected to IFFT to CP attaching section 222.

CP attaching section 222 attaches the same signal as the signal at the tail end part of the reference signal subjected to IFFT, to the head of the reference signal.

Spreading section 223 performs second spreading of the reference signal with a CP by the block-wise spreading code sequence set in control section 209, and outputs the reference signal subjected to second spreading, to multiplexing section 219.

Multiplexing section 219 time-multiplexes the response signal subjected to second spreading and the reference signal subjected to second spreading in one slot, and outputs the result to radio transmitting section 220.

Radio transmitting section 220 performs transmission processing such as D/A conversion, amplification and up-conversion on the response signal subjected to second spreading or the reference signal subjected to second spreading, and transmits the resulting signal from antenna 201 to base station 100 (in FIG. 5). Next, modulation processing in modulating section 213 and scrambling processing in scrambling section 214 will be explained in detail.

In a plurality of response signals subject to second spreading by the same block-wise spreading code sequence, inter-code interference on the cyclic shift axis is the largest between the response signals that are located on the closest positions to each other on the cyclic shift axis. For example, in six response signals subject to second spreading by BW #0 in FIG. 2, the response signal that is transmitted using PUCCH #1 is subject to the largest interference from the response signal that is transmitted using PUCCH #0 and the response signal that is transmitted using PUCCH #2.

Also, the ACK occurrence rate is significantly higher than the NACK occurrence rate, and, consequently, when a NACK is transmitted using an arbitrary PUCCH, there is a high possibility that a response signal that gives interference to the PUCCH is an ACK. Therefore, to improve the error rate performance of a NACK, it is important to reduce interference from an ACK.

Figure 7:
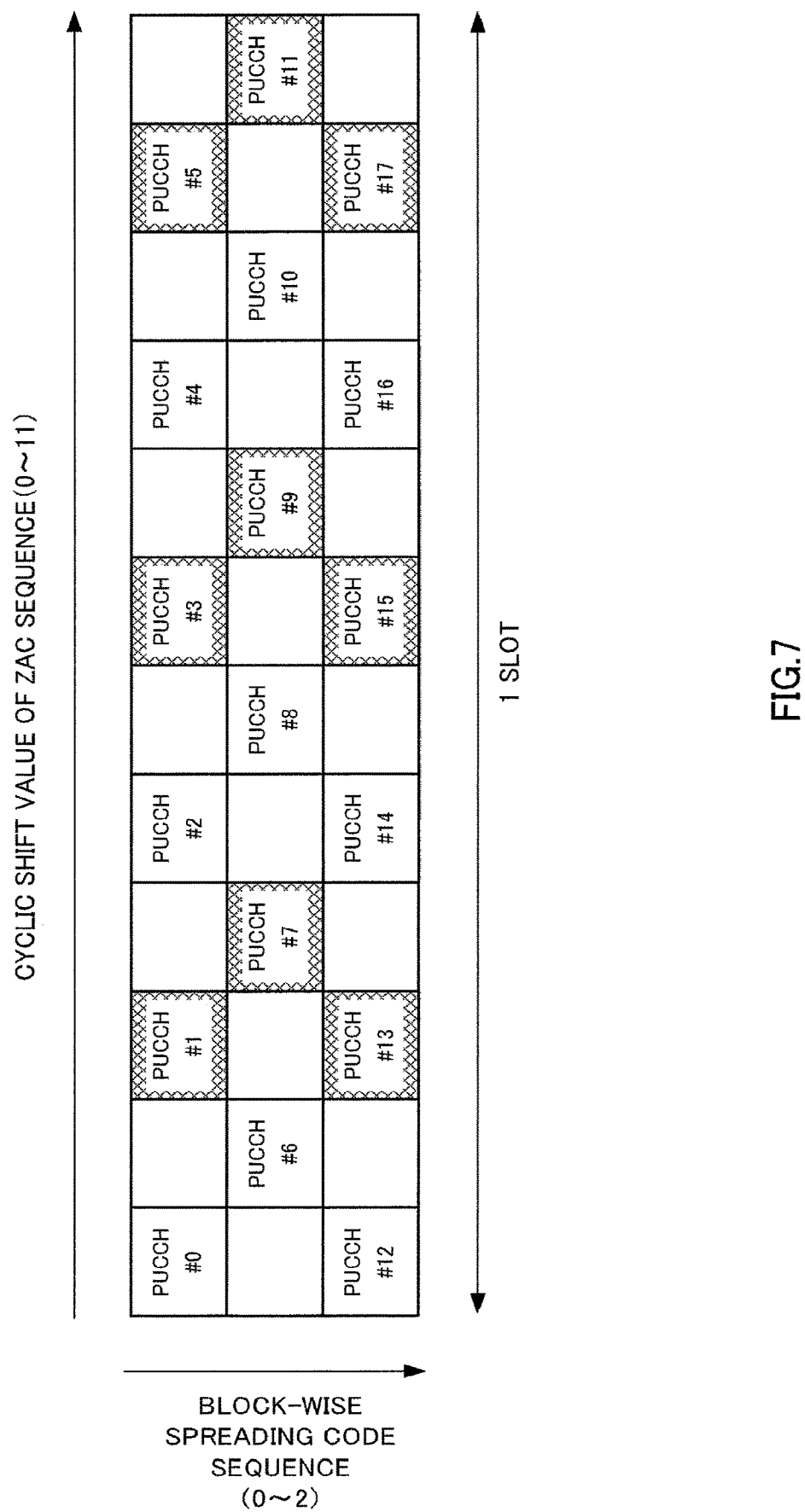
FIG. 7 is a diagram showing a constellation change according to Embodiment 1 of the present invention.

With the present embodiment, as shown in FIG. 7, the constellation of each response signal is rotated on the cyclic shift axis.

Figure 8:
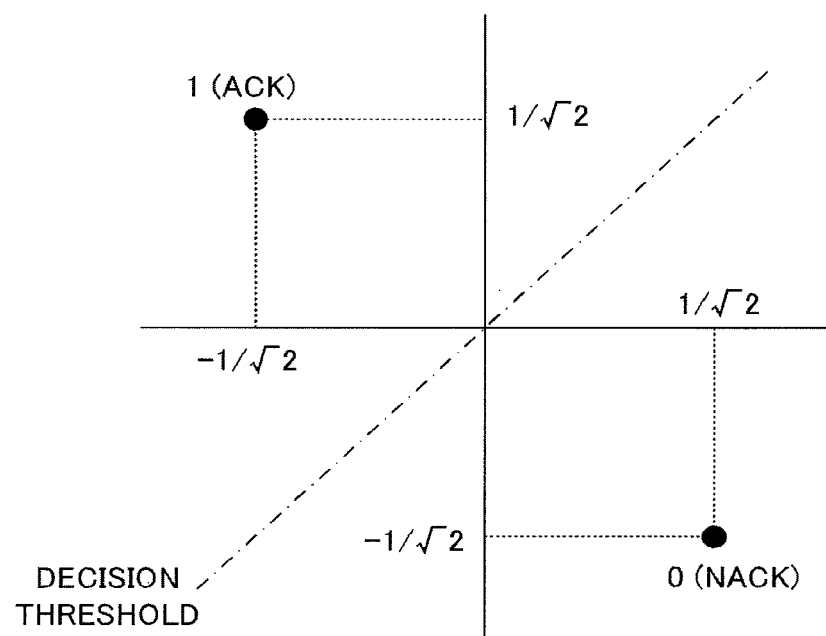
FIG. 8 illustrates a BPSK constellation according to Embodiment 1 of the present invention.
Figure 9:
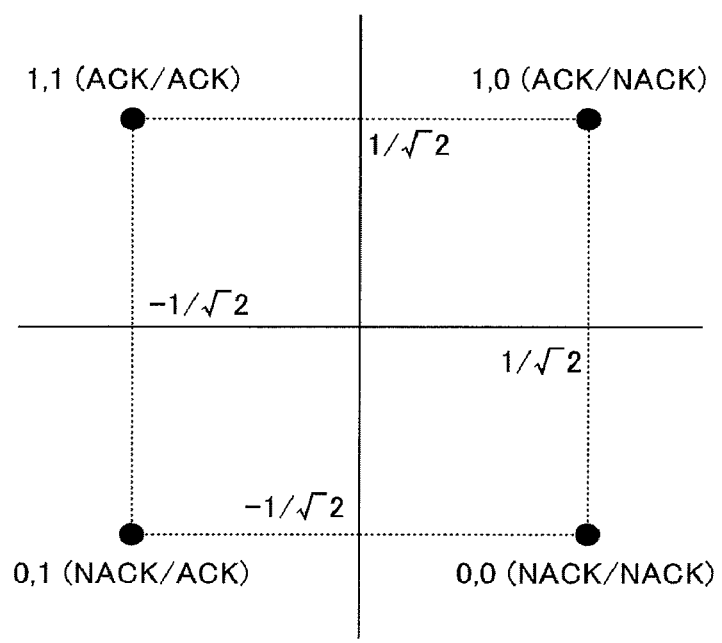
FIG. 9 illustrates a QPSK constellation according to Embodiment 1 of the present invention.

To be more specific, referring to six response signals subject to second spreading by BW #0 in FIG. 7, the constellation acquired by rotating the constellation of a response signal that is transmitted using PUCCH #0, by −90 degrees, is used as the constellation of a response signal that is transmitted using PUCCH #1, and the constellation acquired by rotating the constellation of the response signal that is transmitted using PUCCH #1, by +90 degrees, is used as the constellation of a response signal that is transmitted using PUCCH #2. The same applies to PUCCH #2 to PUCCH #5. For example, when the modulation scheme of response signals is BPSK, constellation #1 of PUCCH #0, PUCCH #2 and PUCCH #4 is as shown in FIG. 3, while constellation #2 of PUCCH #1, PUCCH #3 and PUCCH #5 is as shown in FIG. 8. Also, for example, when the modulation scheme of response signals is QPSK, constellation #1 of PUCCH #0, PUCCH #2 and PUCCH #4 is as shown in FIG. 4, while constellation #2 of PUCCH #1, PUCCH #3 and PUCCH #5 is as shown in FIG. 9. Thus, according to the present embodiment, in ZAC #0, ZAC #2, ZAC #4, ZAC #6, ZAC #8 and ZAC #10 that are used for first spreading of response signals subject to second spreading by BW #0, response signals subject to first spreading by ZAC #0, ZAC #4 and ZAC #8 form the first response signal group, and response signals subject to first spreading by ZAC #2, ZAC #6 and ZAC #10 form the second response signal group. That is, according to the present embodiment, the response signals belonging to the first response signal group and the response signals belonging to the second response signal group are alternately allocated on the cyclic shift axis. While the constellation of the first response signal group is referred to as "constellation #1" (in FIG. 3 and FIG. 4), the constellation of the second response signal group is referred to as "constellation #2" (in FIG. 8 and FIG. 9). That is, according to the present embodiment, the constellation of the second response signal group is rotated by −90 degrees with respect to the constellation of the first response signal group.

Figure 10:
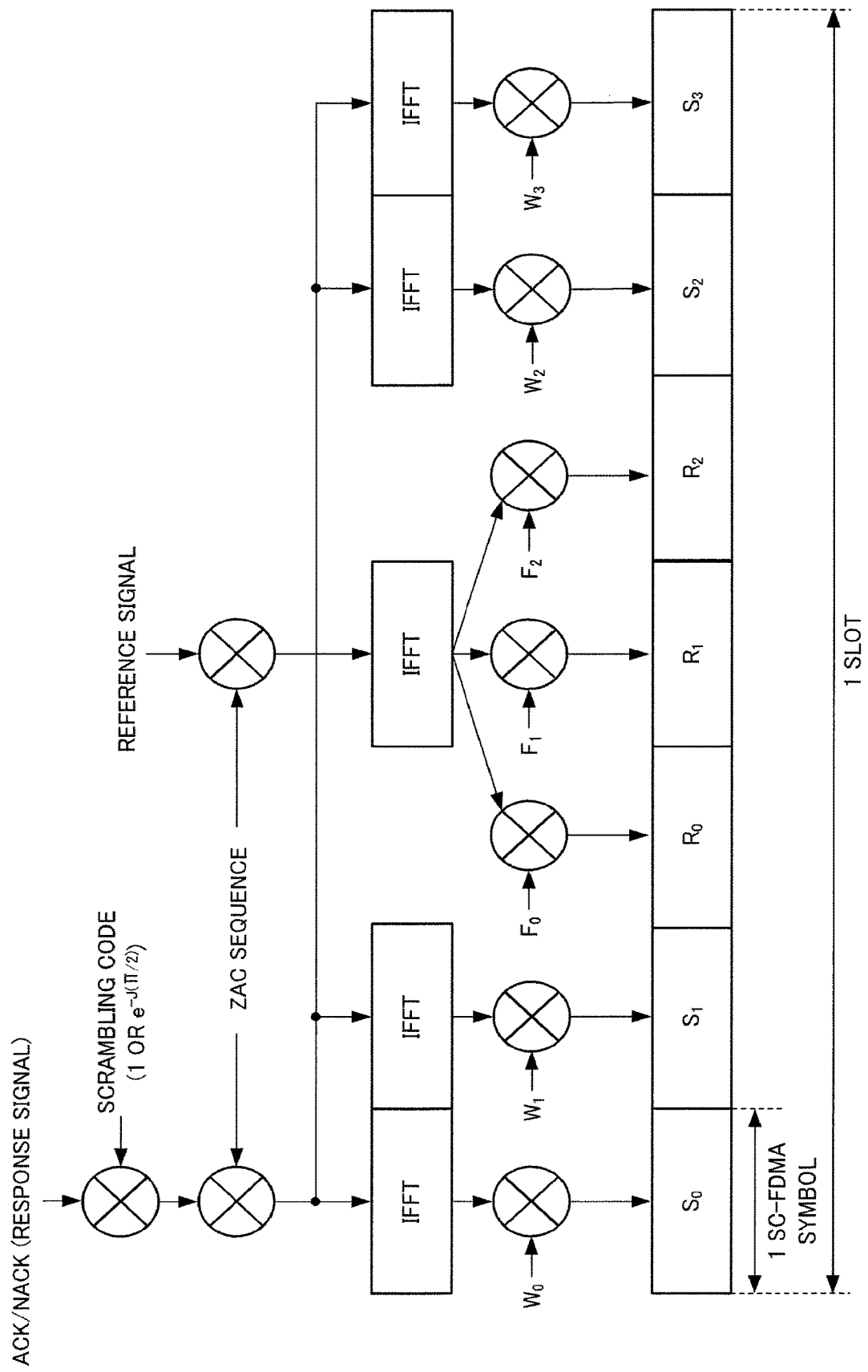
FIG. 10 is a diagram showing scrambling processing according to Embodiment 1 of the present invention.

Also, according to the present embodiment, as shown in FIG. 10, the rotation of constellation is performed by scrambling processing in scrambling section 214.

That is, when the modulation scheme of response signals is BPSK, modulating section 213 modulates the response signals using constellation #1 shown in FIG. 3. Therefore, the signal point of an ACK is $(-1/\sqrt{2}, -1/\sqrt{2})$, and the signal point of a NACK is $(1/\sqrt{2}, 1/\sqrt{2})$. Also, the signal point of a reference signal received as input from spreading section 215 is the same as the signal point of a NACK, $(1/\sqrt{2}, 1/\sqrt{2})$. Then, in response signals subject to second spreading using BW #0, scrambling section 214 multiplies a response signal subject to first spreading using ZAC #0, ZAC #4 or ZAC #8 by scrambling code "1," and multiples a response signal subject to first spreading using ZAC #2, ZAC #6 or ZAC #10 by scrambling code "$e^{-j(\pi/2)}$." Therefore, for the response signal subject to first spreading by ZAC #0, ZAC #4 or ZAC #8, the signal point of an ACK is $(-1/\sqrt{2}, -1/\sqrt{2})$ and the signal point of a NACK is $(1/\sqrt{2}, 1/\sqrt{2})$. That is, the constellation of the response signal subject to first spreading by ZAC #0, ZAC #4 or ZAC #8 is constellation #1 (in FIG. 3). On the other hand, for the response signal subject to first spreading by ZAC #2, ZAC #6 or ZAC #10, the signal point of an ACK is $(-1/\sqrt{2}, 1/\sqrt{2})$ and the signal point of a NACK is $(1/\sqrt{2}, -1/\sqrt{2})$. That is, the constellation of the response signal subject to first spreading by ZAC #2, ZAC #6 or ZAC #10 is constellation #2 (in FIG. 8).

Thus, according to the present embodiment, by scrambling processing in scrambling section 214, the constellation of the second response signal group is rotated by −90 degrees with respect to the constellation of the first response signal group.

As described above, an example case will be described below where mobile station #1 transmits a response signal using PUCCH #1 (in FIG. 7) and another mobile station #2 transmits a response signal using PUCCH #0 (in FIG. 7). Here, constellation #2 (in FIG. 8) is used for the response signal of mobile station #1, and constellation #1 (in FIG. 3) is used for the response signal of mobile station #2.

When mobile station #1 and mobile station #2 both transmit an ACK and the base station receives the response signal from mobile station #1, interference given from the response signal of mobile station #2 to the response signal of mobile station #1 is as follows.

That is, when the ACK and reference signal transmitted from mobile station #1 are received by the base station via a channel, in the base station, a response signal represented by $(-1+j)$ $h1/\sqrt{2}$ and reference signal represented by $(1+j)$ $h1/\sqrt{2}$ are found as a correlation output of mobile station #1.

Also, when the ACK and reference signal transmitted from mobile station #2 are received by the base station via a channel, in the base station, a component represented by $(-1-j)$ $h2/\sqrt{2}$ is found as interference to the response signal of mobile station #1 and a component represented by $(1+j)$ $h2/\sqrt{2}$ is found as interference to the reference signal of mobile station #1 in the correlation output of mobile station #1.

Therefore, when the ACK from mobile station #1 and the ACK from mobile station #2 are code-multiplexed, in the base station, a response signal represented by $(1+j)(jh1-h2)/\sqrt{2}$ and reference signal represented by $(1+j)(h1+h2)/\sqrt{2}$ are found in the correlation output of mobile station #1.

Therefore, the interference component given from the ACK of mobile station #2 to the ACK of mobile station #1 (i.e., the Euclidean distance from $(-1+j)/\sqrt{2}$) by the synchronous detection in the base station, is represented by equation 5.

[5]

$$\frac{(1+j)}{\sqrt{2}}\left(j - \frac{jh_1 - h_2}{h_1 + h_2}\right) = \frac{(1+j)}{\sqrt{2}}\left(\frac{(1+j)h_2}{h_1 + h_2}\right) \quad \text{(Equation 5)}$$

Also, when mobile station #1 transmits a NACK, mobile station #2 transmits an ACK and the base station receives the response signal from mobile station #1, interference given from the response signal of mobile station #2 to the response signal of mobile station #1 is as follows.

That is, when the NACK and reference signal transmitted from mobile station #1 are received by the base station via a channel, in the base station, a response signal represented by $(1-j)$ $h1/\sqrt{2}$ and reference signal represented by $(1+j)$ $h1/\sqrt{2}$ are found as a correlation output of mobile station #1.

Also, when the ACK and reference signal transmitted from mobile station #2 are received by the base station via a channel, in the base station, a component represented by $(-1-j)$ $h2/\sqrt{2}$ is found as interference to the response signal of mobile station #1 and a component represented by $(1+j)$ $h2/\sqrt{2}$ is found as interference to the reference signal of mobile station #1 in the correlation output of mobile station #1.

Therefore, when the NACK from mobile station #1 and the ACK from mobile station #2 are code-multiplexed, in the base station, a response signal represented by $(1+j)(-jh1+h2)/\sqrt{2}$ and reference signal represented by $(1+j)(h1+h2)/\sqrt{2}$ are found in the correlation output of mobile station #1.

Therefore, the interference component given from the ACK of mobile station #2 to the NACK of mobile station #1 (i.e., the Euclidean distance from $(1-j/\sqrt{2})$ by the synchronous detection in the base station, is represented by equation 6.

[6]

$$\frac{(1+j)}{\sqrt{2}}\left(-j - \frac{-jh_1 - h_2}{h_1 + h_2}\right) = \frac{(1+j)}{\sqrt{2}}\left(\frac{(1-j)h_2}{h_1 + h_2}\right) \quad \text{(Equation 6)}$$

Similarly, according to the present embodiment, when both mobile station #1 and mobile station #2 transmit a NACK signal, the interference component given from the NACK of mobile station #2 to the NACK of mobile station #1 (i.e., the Euclidean distance from $(1-j)/\sqrt{2}$) by the synchronous detection in the base station, is as shown in equation 7. Also, according to the present invention, when mobile station #1 transmits an ACK and mobile station #2 transmits a NACK, the interference component given from the NACK of mobile station #2 to the ACK of mobile station #1 (i.e., the Euclidean distance from $(-1+j)/\sqrt{2}$) by the synchronous detection in the base station, is as shown in equation 8.

[7]

$$\frac{(1+j)}{\sqrt{2}}\left(-j - \frac{-jh_1 + h_2}{h_1 + h_2}\right) = \frac{(1+j)}{\sqrt{2}}\left(\frac{(-1-j)h_2}{h_1 + h_2}\right) \quad \text{(Equation 7)}$$

[8]

$$\frac{(1+j)}{\sqrt{2}}\left(j - \frac{jh_1 + h_2}{h_1 + h_2}\right) = \frac{(1+j)}{\sqrt{2}}\left(\frac{(-1+j)h_2}{h_1 + h_2}\right) \quad \text{(Equation 8)}$$

When the interference components represented by equation 5 to equation 8 are compared, it is understood that the magnitudes of the interference components represented by equation 5 to equation 8 are the same. That is, according to the present embodiment, regardless of the ACK occurrence rate or the NACK occurrence rate, it is possible to make the error rate of an ACK and the error rate of a NACK equal. Therefore, according to the present embodiment, it is possible to make ACK received quality and NACK received quality equal.

Also, according to the present embodiment, scrambling section 214 may multiply a modulated response signal by a scrambling code of "1" or "$e^{j(\pi/2)}$," and rotate the constellation of the second response signal group by +90 degrees with respect to the constellation of the first response signal group.

Embodiment 2

Figure 11:
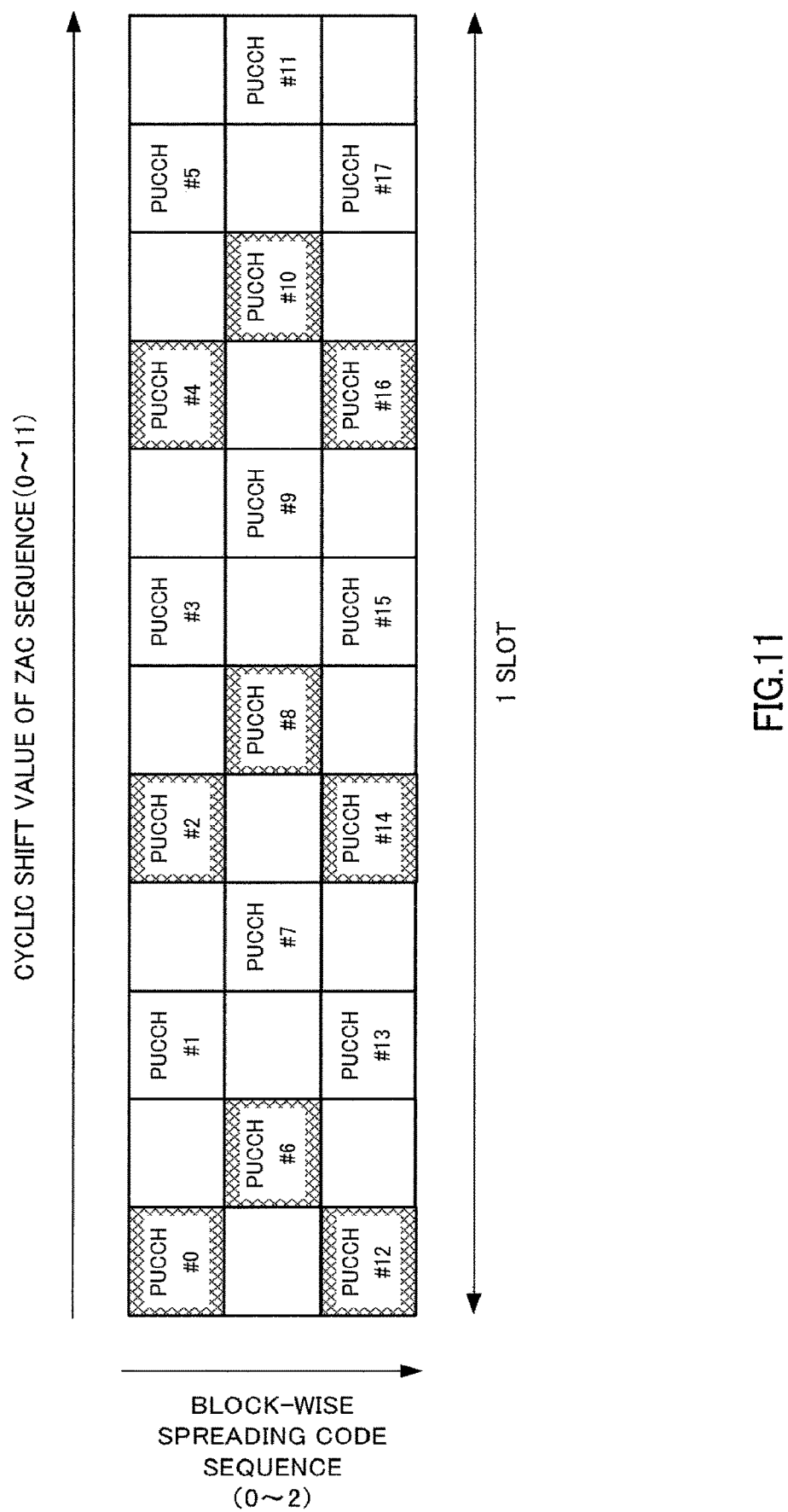
FIG. 11 is a diagram showing a constellation change according to Embodiment 2 of the present invention.

With the present embodiment, for example, while the constellation is rotated in cell #1 as shown in FIG. 7, the constellation is rotated in cell #2 adjacent to cell #1 as shown in FIG. 11. Therefore, for example, referring to PUCCH #1, while constellation #2 (in FIG. 8 and FIG. 9) is used for PUCCH #1 in cell #1, constellation #1 (in FIG. 3 and FIG. 4) is used for PUCCH #1 in cell #2. Similarly, referring to PUCCH #2, while constellation #1 (in FIG. 3 and FIG. 4) is used for PUCCH #2 in cell #1, constellation #2 (in FIG. 8 and FIG. 9) is used for PUCCH #2 in cell #2.

That is, with the present invention, further to Embodiment 1, between two adjacent cells, the constellation of one of two response signals subject to first spreading by ZAC sequences of the same cyclic shift value, is rotated by 90 degrees with respect to the constellation of the other response signal.

By this means, between a plurality of adjacent cells, it is possible to randomize interference between a plurality of response signals subject to first spreading by ZAC sequences of the same cyclic shift value. That is, according to the present embodiment, it is possible to randomize and reduce inter-cell interference between response signals.

Embodiment 3

With the present embodiment, the constellation is rotated upon modulation of response signals.

Figure 12:
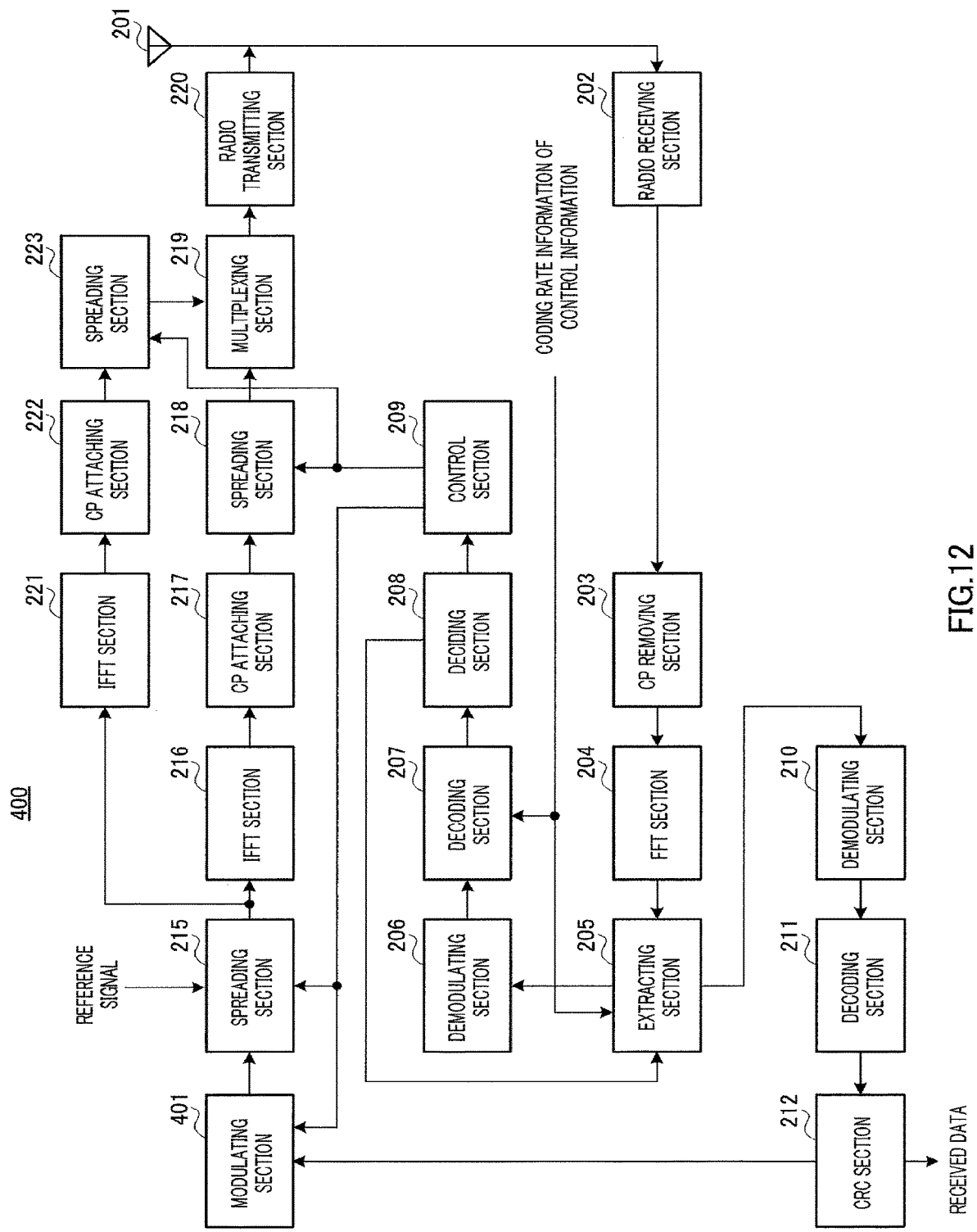
FIG. 12 is a block diagram showing the configuration of a mobile station according to Embodiment 3 of the present invention.

FIG. 12 illustrates the configuration of mobile station 400 according to the present embodiment. Here, in FIG. 12, the same components as in FIG. 6 (Embodiment 1) will be assigned the same reference numerals and their explanation will be omitted.

In mobile station 400, a ZAC sequence selected in control section 209 is reported to modulating section 401.

Then, in response signals subject to second spreading using BW #0 shown in FIG. 7, modulating section 401 modulates a response signal subject to first spreading by ZAC #0, ZAC #4 or ZAC #8 (i.e., first response signal group) using constellation #1 (in FIG. 3 and FIG. 4), and modulates a response signal subject to first spreading by ZAC #2, ZAC #6 or ZAC #10 (i.e., second response signal group) using constellation #2 (in FIG. 8 and FIG. 9).

Thus, according to the present embodiment, upon modulation processing in modulating section 401, the constellation of the second response signal group is rotated by 90 degrees with respect to the constellation of the first response signal group. That is, according to the present embodiment, modulating section 401 functions as a modulating means that modulates a response signal and as a rotating means that rotates the constellation of the response signal. Therefore, the present embodiment does not require scrambling section 214 (in FIG. 6) and descrambling section 116 (in FIG. 5) in Embodiment 1.

Thus, by performing rotation processing in modulating section 401 instead of scrambling section 214, it is possible to achieve the same effect as in Embodiment 1.

Embodiment 4

Figure 13:
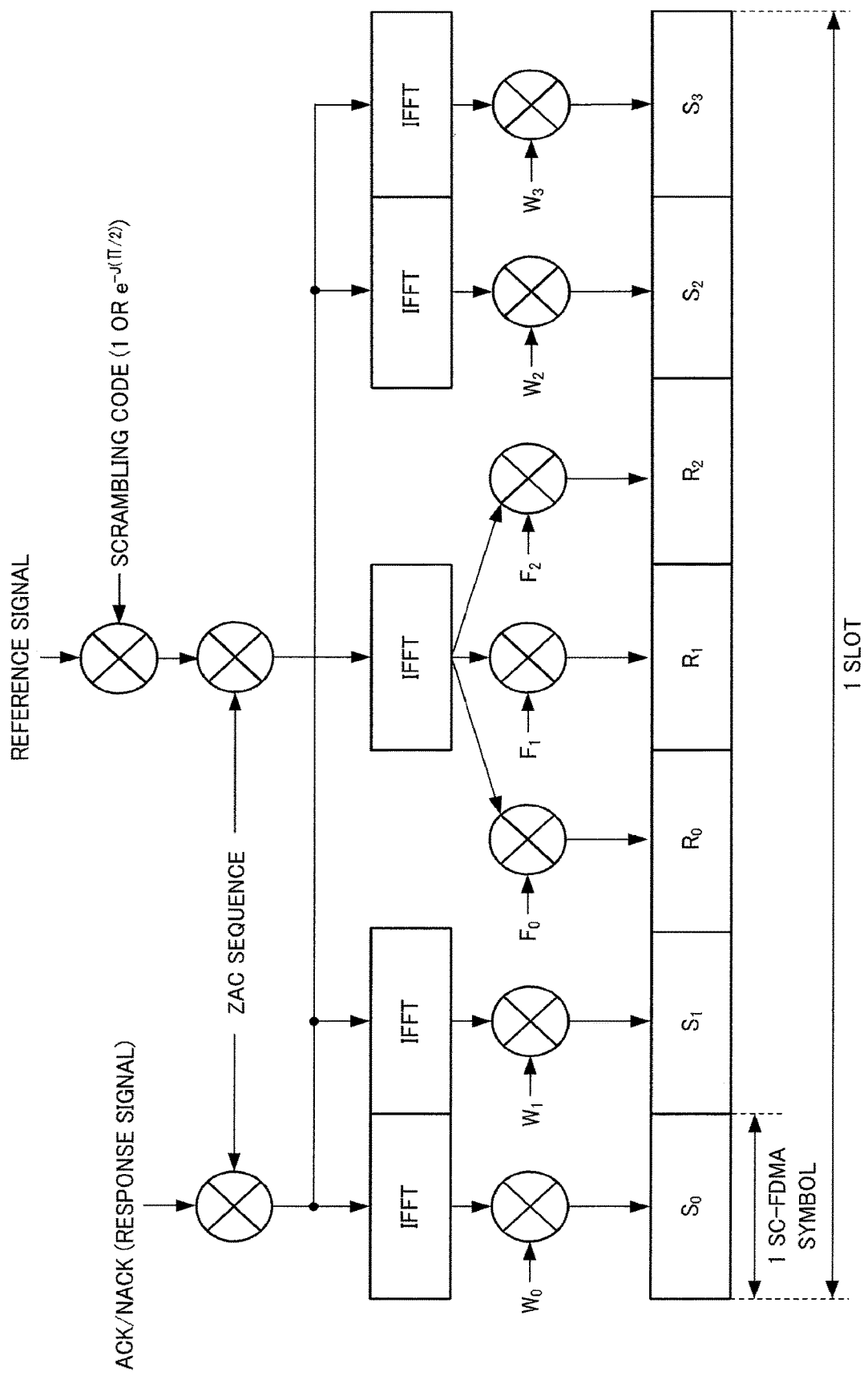
FIG. 13 is a diagram showing scrambling processing according to Embodiment 4 of the present invention.

Embodiments 1 to 3 rotate the constellation of a response signal without changing the constellation of a reference signal. By contrast with this, as shown in FIG. 13, the present embodiment rotates the constellation of a reference signal without changing the constellation of a response signal.

Figure 14:
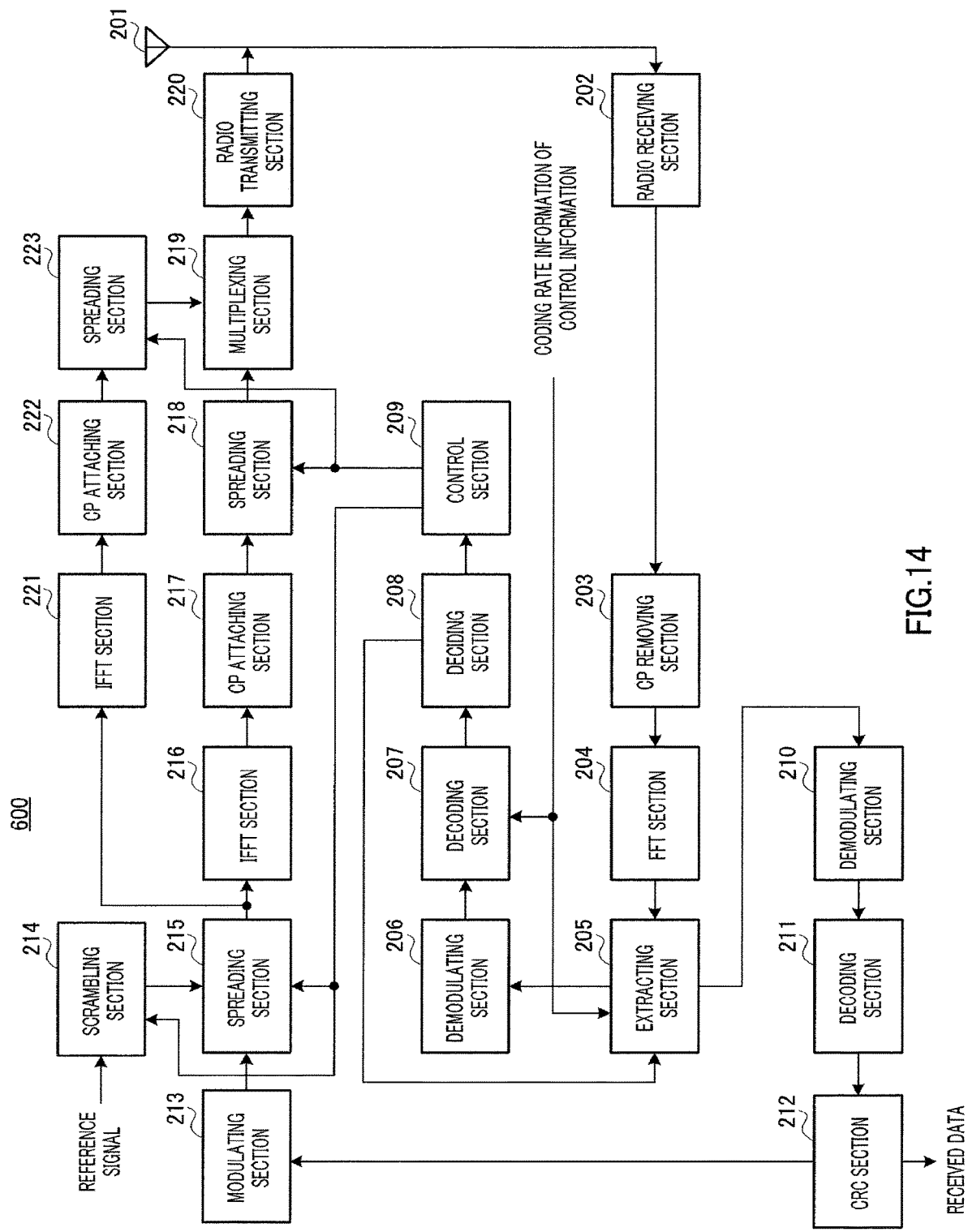
FIG. 14 is a block diagram showing the configuration of a mobile station according to Embodiment 4 of the present invention.

FIG. 14 illustrates the configuration of mobile station 600 according to the present embodiment. Here, in FIG. 14, the same components as in FIG. 6 (Embodiment 1) will be assigned the same reference numerals and their explanation will be omitted.

In mobile station 600, when the modulation scheme of response signals is BPSK, scrambling section 214 multiplies a reference signal subject to first spreading using ZAC #0, ZAC #4 or ZAC #8 by "1," and multiples a reference signal subject to first spreading using ZAC #2, ZAC #6 or ZAC #10 by "$e^{-j(\pi/2)}$." Therefore, the signal point of a reference signal subject to first spreading by ZAC #0, ZAC #4 or ZAC #8 is ($1/\sqrt{2}$, $1/\sqrt{2}$), and the signal point of a reference signal subject to first spreading by ZAC #2, ZAC #6 or ZAC #10 is ($1/\sqrt{2}$, $-1/\sqrt{2}$).

Thus, by scrambling processing in scrambling section 214, the present embodiment rotates the constellation of a reference signal for the second response signal group by −90 degrees with respect to the constellation of a reference signal for the first response signal group.

Thus, by performing rotation processing of the constellation of a reference signal in scrambling section 214, it is equally possible to achieve the same effect as in Embodiment 1.

Also, according to the present embodiment, scrambling section 214 may multiply a reference signal by a scrambling code of "1" or "$e^{j(\pi/2)}$," and rotate the constellation of a reference signal for the first response signal group by +90 degrees with respect to the constellation of a reference signal for the second response signal group.

Embodiment 5

Figure 15:
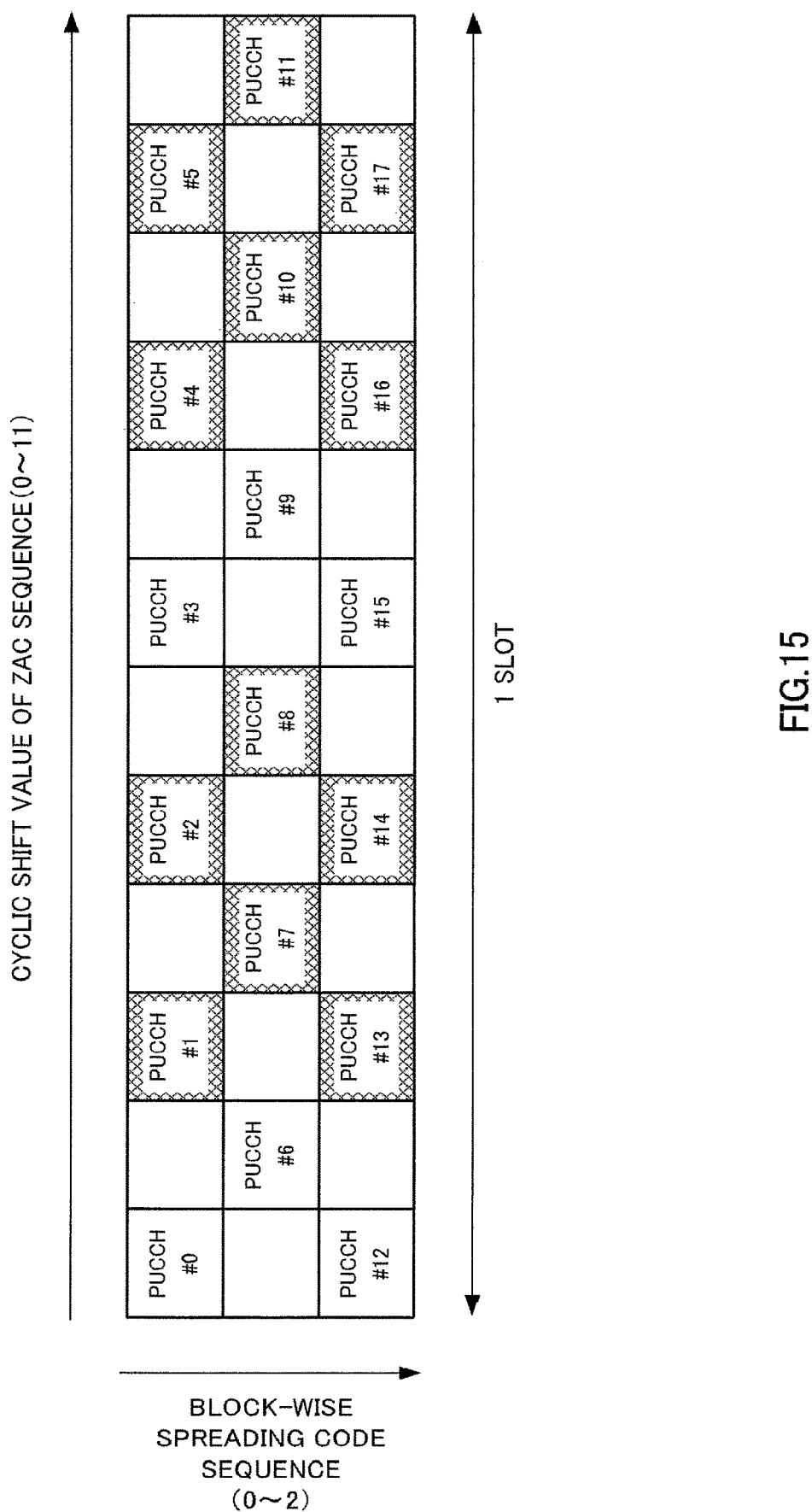
FIG. 15 is a diagram showing a constellation change according to Embodiment 5 of the present invention.

If there is a large difference of received power between response signals from a plurality of mobile stations in a base station, response signals of the higher received power may interfere with response signals of the lower received power. For example, in response signals subject to second spreading using BW #0 shown in FIG. 15, when the received power of a response signal that is transmitted using PUCCH #0 and received power of a response signal that is transmitted using PUCCH #3 are higher, and the received power of response signals that are transmitted using the other PUCCHs are lower, the response signal that is transmitted using PUCCH #0 and the response signal that is transmitted using PUCCH #3 give the largest interference to the response signals that are transmitted using the other PUCCHs.

Therefore, in this case, in ZAC #0, ZAC #2, ZAC #4, ZAC #6, ZAC #8 and ZAC #10 that are used for first spreading of response signals subject to second spreading using BW #0, the response signals subject to first spreading by ZAC #0 and ZAC #6 form the first response signal group, and the response signals subject to first spreading by ZAC #2, ZAC #4, ZAC #8 and ZAC #10 form the second response signal group. Then, while the constellation of the first response signal group is constellation #1 (in FIG. 3 and FIG. 4), the constellation of the second response signal group is constellation #2 (in FIG. 8 and FIG. 9). That is, the present embodiment rotates the constellation of the second response signal group of the lower received power by −90 degrees with respect to the constellation of the first response signal group of the higher received power.

Also, the present embodiment may rotate the constellation of the second response signal group of the lower received power by +90 degrees with respect to the constellation of the first response signal group of the higher received power.

Thus, according to the present embodiment, by rotating the constellation of a signal of the lower received power by 90 degrees with respect to the constellation of a response signal of the higher received power on the cyclic shift axis, it is possible to prevent an increased NACK error rate by inter-code interference from an ACK due to the received power difference, and, as in Embodiment 1, make the ACK error rate and NACK error rate equal.

Embodiment 6

Figure 16:
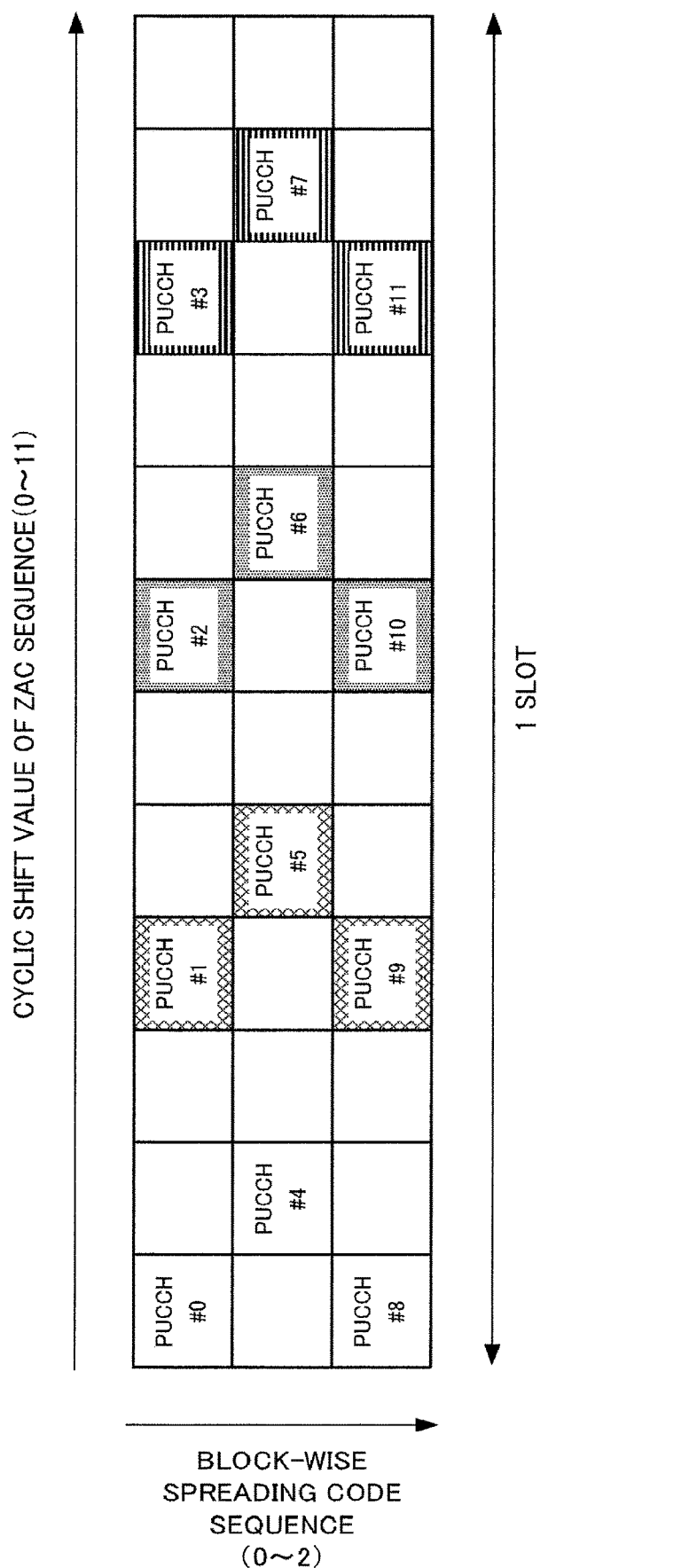
FIG. 16 is a diagram showing a constellation change according to Embodiment 6 of the present invention.

A case will be explained with the present embodiment where twelve PUCCHs shown in FIG. 16 are defined.

In this case, referring to four response signals subject to second spreading by BW #0 in FIG. 16, the constellation acquired by rotating the constellation of the response signal that is transmitted using PUCCH #0, by −90 degrees, is the constellation of the response signal that is transmitted using PUCCH #1, the constellation acquired by rotating the constellation of the response signal that is transmitted using PUCCH #1, by −90 degrees, is the constellation of the response signal that is transmitted using PUCCH #2, and the constellation acquired by rotating the constellation of the response signal that is transmitted using PUCCH #2, by −90 degrees, is the constellation of the response signal that is transmitted using PUCCH #3.

Figure 17:
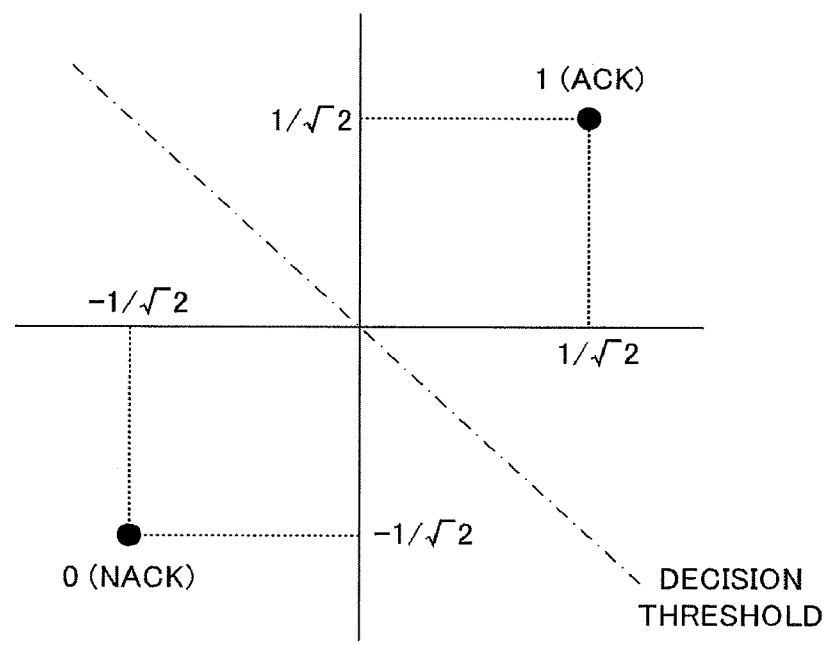
FIG. 17 illustrates a BPSK constellation according to Embodiment 6 of the present invention.
Figure 18:
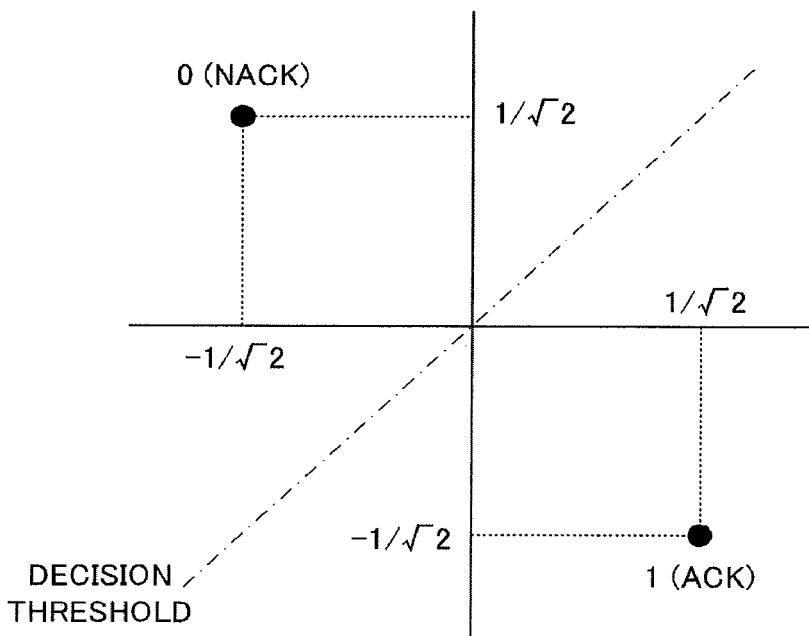
FIG. 18 illustrates a BPSK constellation according to Embodiment 6 of the present invention.
Figure 19:
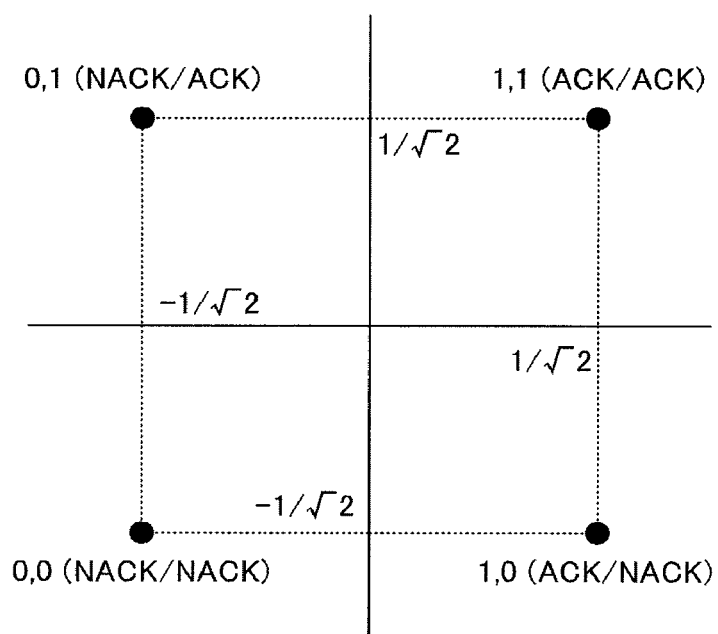
FIG. 19 illustrates a QPSK constellation according to Embodiment 6 of the present invention.
Figure 20:
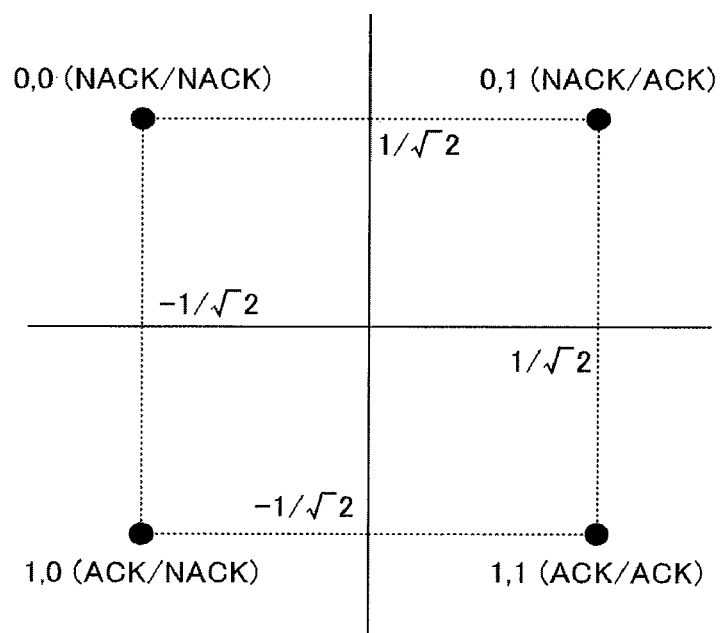
FIG. 20 illustrates a QPSK constellation according to Embodiment 6 of the present invention.

For example, when the modulation scheme of response signals is BPSK, constellation #1 in PUCCH #0 is as shown in FIG. 3, constellation #2 in PUCCH #1 is as shown in FIG. 8, constellation #3 in PUCCH #2 is as shown in FIG. 17, and constellation #4 in PUCCH #3 is as shown in FIG. 18. Also, when the modulation scheme of response signals is QPSK, constellation #1 in PUCCH #0 is as shown in FIG. 4, constellation #2 in PUCCH #1 is as shown in FIG. 9, constellation #3 in PUCCH #2 is as shown in FIG. 19, and constellation #4 in PUCCH #3 is as shown in FIG. 20.

Thus, the present embodiment rotates the constellation of each response signal by −90 degrees on the cyclic shift axis. That is, although two constellations are used in Embodiment 1, four constellations are used in the present embodiment. Therefore, according to the present embodiment, it is possible to further randomize interference between response signals than in Embodiment 1. That is, according to the present embodiment, it is further possible to make the ACK error rate and NACK error rate equal.

Also, the present embodiment may rotate the constellation of each response signal by +90 degrees on the cyclic shift axis.

Embodiment 7

A case will be explained with the present embodiment where a base station detects that a mobile station fails to receive control information to carry the resource allocation result of downlink data.

The mobile station performs a blind detection of whether or not control information is directed to the mobile station as described above, and, consequently, if the mobile station fails to receive control information due to poor channel condition, the mobile station has no way of knowing whether or not downlink data directed to the mobile station has been transmitted from the base station. Therefore, in this case, the mobile station does not receive data nor transmit a response signal. Thus, when a response signal is not transmitted from the mobile station to the base station, the base station needs to detect whether a response signal is not transmitted from the mobile station, in addition to decide whether the response signal is an ACK or a NACK.

Here, non-transmission of a response signal from a mobile station is referred to as "DTX (discontinuous transmission)".

Normally, a threshold decision is used to detect DTX. That is, the base station measures the received power of a PUCCH that is used to transmit a response signal from the mobile station, detect DTX if the received power is lower than a threshold, and decides that an ACK or a NACK is transmitted from the mobile station if the received power is equal to or higher than the threshold.

However, PUCCHs are separated by using different cyclic shift values of ZAC sequences and block-wise spreading code sequences. If the delay in a channel is large, if the transmission timing of a mobile station involves error or if transmission power control involves error, interference is significant especially on the cyclic shift axis. Therefore, if the base station tries to decide whether or not DTX is detected by a threshold decision of power in these cases, decision error is caused due to interference of leaked power from another mobile station that transmits a response signal using the ZAC sequence of the adjacent cyclic shift value. For example, if mobile station #1 transmits an ACK using ZAC #0 and mobile station #2 that should transmit a response signal using ZAC #1 fails to receive control information and does not transmit a response signal, the power of the response signal from mobile station #1 may leak even after correlation processing to detect a response signal from mobile station #2. In this case, a conventional technique cannot decide whether a response signal is transmitted using ZAC #1 or power leaks from ZAC #0.

Therefore, similar to Embodiment 1 (FIG. 7), the present embodiment rotates the constellation of each response signal on the cyclic shift axis.

As in Embodiment 1, an example case will be described below where mobile station #1 transmits a response signal using PUCCH #1 (in FIG. 7) and another mobile station #2 transmits a response signal using PUCCH #0 (in FIG. 7). Also, an example case will be described below where the modulation scheme of response signals is BPSK. Here, constellation #2 (in FIG. 8) is used for a response signal of mobile station #1 and constellation #1 (in FIG. 3) is used for a response signal of mobile station #2.

When mobile station #1 and mobile station #2 both transmit an ACK and the base station receives the response signal from mobile station #1, interference given from the response signal of mobile station #2 to the response signal of mobile station #1 is as follows.

That is, when the ACK and reference signal transmitted from mobile station #1 are received by the base station via a channel, in the base station, a response signal represented by $(-1+j)\,h1/\sqrt{2}$ and reference signal represented by $(1+j)\,h1/\sqrt{2}$ are found as a correlation output of mobile station #1.

Also, when the ACK and reference signal transmitted from mobile station #2 are received by the base station via a channel, in the base station, a component represented by $(-1-j)\,h2/\sqrt{}$ is found as interference to the response signal of mobile station #1 and a component represented by $(1+j)\,h2/\sqrt{2}$ is found as interference to the reference signal of mobile station #1 in the correlation output of mobile station #1.

Therefore, when the ACK from mobile station #1 and ACK from mobile station #2 are code-multiplexed, in the base station, a response signal represented by $(1+j)(jh1-h2)\sqrt{2}$ and reference signal represented by $(1+j)(h1+h2)\sqrt{2}$ are found in the correlation output of mobile station #1. That is, in this case, the output of synchronous detection in the base station is as shown in equation 9.

[9]

$$\frac{jh_1 - h_2}{h_1 + h_2} \qquad \text{(Equation 9)}$$

Also, when mobile station #2 transmits an ACK and mobile station #1 fails to receive control information and does not transmit a response signal, in the base station, a response signal represented by $(1+j)(-h2)/\sqrt{2}$ and reference signal represented by $(1+j)(h2)/\sqrt{2}$ are found in the correlation output of mobile station #1. Therefore, in this case, the output of synchronous detection in the base station is as shown in equation 10.

[10]

$$\frac{-h_2}{h_2} = -1 \qquad \text{(Equation 10)}$$

Comparing equation 9 and equation 10, it is understood that, when a response signal is provided from mobile station #1, there are the quadrature component (i.e., the value on the Q axis or complex component) and in-phase component (i.e., the value on the I axis or real number component) in the synchronous detection output, while, when a response signal is not provided from mobile station #1, there is no quadrature component but is only the in-phase component in the synchronous detection output.

Also, another example case will be described where mobile station #1 transmits a response signal using PUCCH #2 (in FIG. 7) and another mobile station #2 transmits a response signal using PUCCH #1 (in FIG. 7). Here, constellation #1 (in FIG. 3) is used for the response signal of mobile station #1 and constellation #2 (in FIG. 8) is used for the response signal of mobile station #2.

When mobile station #1 and mobile station #2 both transmit an ACK and the base station receives the response signal from mobile station #1, interference given from the response signal of mobile station #2 to the response signal of mobile station #1 is as follows.

That is, when the ACK and reference signal transmitted from mobile station #1 are received by the base station via a channel, in the base station, a response signal represented by $(-1-j)$ h1/$\sqrt{2}$ and reference signal represented by $(1+j)$ h1/$\sqrt{2}$ are found as a correlation output of mobile station #1.

Also, when the ACK and reference signal transmitted from mobile station #2 are received by the base station via a channel, in the base station, a component represented by $(-1+j)$ h2/$\sqrt{2}$ is found as interference to the response signal of mobile station #1 and a component represented by $(1+j)$ h2/$\sqrt{2}$ is found as interference to the reference signal of mobile station #1 in the correlation output of mobile station #1.

Therefore, when the ACK from mobile station #1 and ACK from mobile station #2 are code-multiplexed, in the base station, a response signal represented by $(1+j)(-h1+jh2)/\sqrt{2}$ and reference signal represented by $(1+j)(h1+h2)/\sqrt{2}$ are found in the correlation output of mobile station #1. That is, in this case, the output of synchronous detection in the base station is as shown in equation 11.

[11]

$$\frac{-h_1 + jh_2}{h_1 + h_2} \quad \text{(Equation 11)}$$

Also, when mobile station #2 transmits an ACK and mobile station #1 fails to receive control information and does not transmit a response signal, in the base station, a response signal represented by $(1+j)(jh2)/\sqrt{2}$ and reference signal represented by $(1+j)(h2)/\sqrt{2}$ are found in the correlation output of mobile station #1. Therefore, in this case, the output of synchronous detection in the base station is as shown in equation 12.

[12]

$$\frac{jh_2}{h_2} = j \quad \text{(Equation 12)}$$

Comparing equation 11 and equation 12, it is understood that, when a response signal is provided from mobile station #1, there are the quadrature component and in-phase component in the synchronous detection output, while, when a response signal is not provided from mobile station #1, there is no quadrature component but is only the in-phase component in the synchronous detection output.

Therefore, according to the present embodiment, a base station can decide whether or not DTX is detected for a response signal from a mobile station, based on one of the magnitude of the in-phase component and the magnitude of the quadrature component in the synchronous detection output. Also, a response signal that is transmitted from a mobile station using the ZAC sequence of an adjacent cyclic shift value, does not have a negative effect on the detection of DTX, so that, even when there is significant interference from a response signal transmitted from the mobile station using the ZAC sequence of the adjacent cyclic shift value, it is possible to identify DTX accurately.

Embodiment 8

Similar to Embodiment 7, a case will be explained with the present embodiment where a base station detects that a mobile station fails to receive control information to report a resource allocation result of downlink data.

Figure 21:
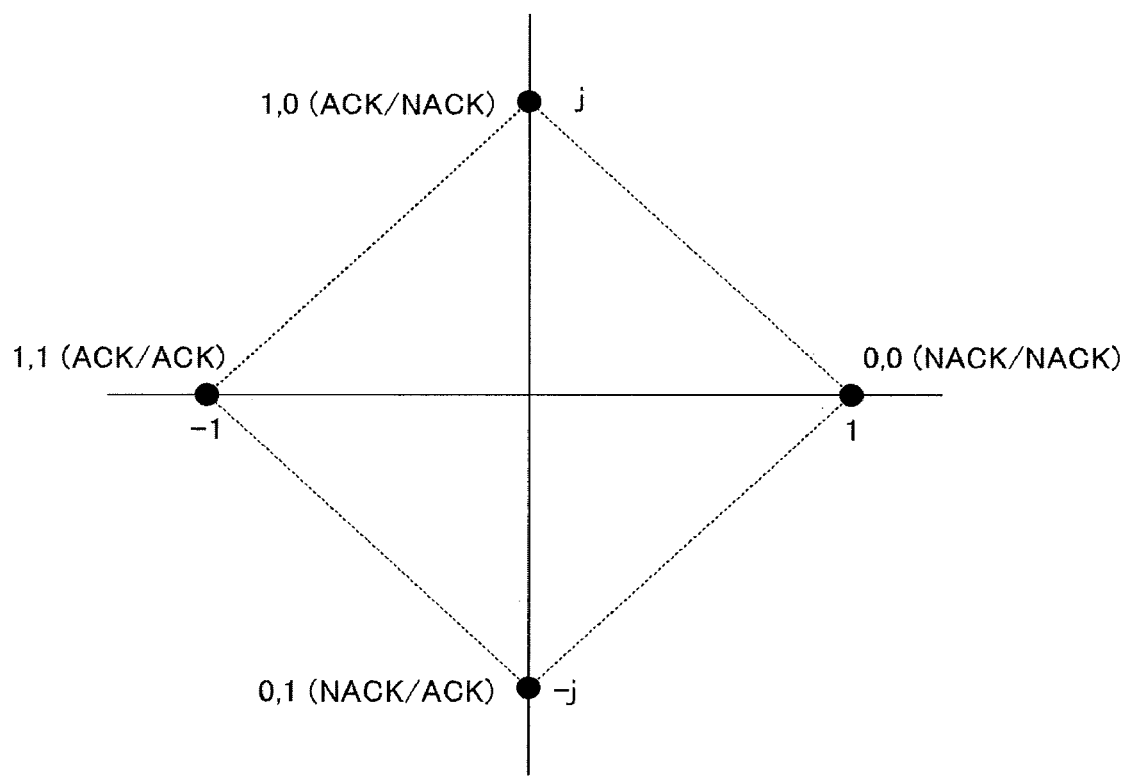
FIG. 21 illustrates a QPSK constellation according to Embodiment 8 of the present invention.

Here, an example case will be described with the present embodiment where the modulation scheme of response signals is QPSK. Also, as in Embodiment 1, an example case will be described where mobile station #1 transmits a response signal using PUCCH #1 (in FIG. 7) and another mobile station #2 transmits a response signal using PUCCH #0 (in FIG. 7). Also, with the present embodiment, constellation #2 (in FIG. 21) is used for the response signal of mobile station #1 and constellation #1 (in FIG. 4) is used for the response signal of mobile station #2.

When mobile station #1 and mobile station #2 both transmit a "ACK/ACK" and the base station receives the response signal from mobile station #1, interference given from the response signal of mobile station #2 to the response signal of mobile station #1 is as follows.

That is, when the "ACK/ACK" and reference signal transmitted from mobile station #1 are received by the base station via a channel, in the base station, a response signal represented −h1 and reference signal represented by $(1+j)$ h1/$\sqrt{2}$ are found as a correlation output of mobile station #1.

Also, when the "ACK/ACK" and reference signal transmitted from mobile station #2 are received by the base station via a channel, in the base station, a component represented by $(-1-j)$ h2/$\sqrt{2}$ is found as interference to the response signal of mobile station #1 and component represented by $(1+j)$ h2/$\sqrt{2}$ is found as interference to the reference signal of mobile station #1 in the correlation output of mobile station #1.

Therefore, when the "ACK/ACK" from mobile station #1 and "ACK/ACK" from mobile station #2 are code-multiplexed, in the base station, a response signal represented by $\{-\sqrt{2}h1-(1+j)h2\}/\sqrt{2}$ and reference signal represented by $(1+j)(h1+h2)/\sqrt{2}$ are found in the correlation output of mobile station #1. That is, in this case, the output of synchronous detection in the base station is as shown in equation 13.

[13]

$$\frac{-\sqrt{2}\,h_1 - (1+j)h_2}{(1+j)(h_1+h_2)} \quad \text{(Equation 13)}$$

Also, when mobile station #2 transmits a "ACK/ACK" and mobile station #1 fails to receive control information and does not transmit a response signal, in the base station, a response signal represented by $(1+j)(-h2)/\sqrt{2}$ and reference signal represented by $(1+j)(h2)/\sqrt{2}$ are found in the correlation output of mobile station #1. Therefore, in this case, the output of synchronous detection in the base station is as shown in equation 14.

$$\frac{-h_2}{h_2} = -1 \qquad \text{(Equation 14)}$$

Comparing equation 13 and equation 14, it is understood that, when a response signal is provided from mobile station #1, there are the quadrature component and in-phase component in the synchronous detection output, while, when a response signal is not provided from mobile station #1, there is no quadrature component but is only the in-phase component in the synchronous detection output. Therefore, the base station can identify DTX accurately by measuring how distant the synchronous detection output is from the I axis.

Also, another example case will be described where mobile station #1 transmits a response signal using PUCCH #2 (in FIG. 7) and another mobile station #2 transmits a response signal using PUCCH #1 (in FIG. 7). Here, according to the present embodiment, constellation #1 (in FIG. 4) is used for the response signal of mobile station #1 and constellation #2 (in FIG. 21) is used for the response signal of mobile station #2.

When mobile station #1 and mobile station #2 both transmit a "ACK/ACK" and the base station receives the response signal from mobile station #1, interference given from the response signal of mobile station #2 to the response signal of mobile station #1 is as follows.

That is, when the "ACK/ACK" and reference signal transmitted from mobile station #1 are received by the base station via a channel, in the base station, a response signal represented by $(-1-j)$ h1/$\sqrt{2}$ and reference signal represented by $(1+j)$ h1/$\sqrt{2}$ are found as a correlation output of mobile station #1.

Also, when the "ACK/ACK" and reference signal transmitted from mobile station #2 are received by the base station via a channel, in the base station, a component represented by $-h2$ is found as interference to the response signal of mobile station #1 and a component represented by $(1+j)$ h2/$\sqrt{2}$ is found as interference to the reference signal of mobile station #1 in the correlation output of mobile station #1.

Therefore, when the "ACK/ACK" from mobile station #1 and "ACK/ACK" from mobile station #2 are code-multiplexed, in the base station, a response signal represented by $\{-(1+j)h1-\sqrt{2}h2\}/\sqrt{2}$ and reference signal represented by $(1+j)(h1+h2)/\sqrt{2}$ are found in the correlation output of mobile station #1. That is, in this case, the output of synchronous detection in the base station is as shown in equation 15.

$$\frac{-(1+j)h_1 - \sqrt{2}h_2}{(1+j)(h_1+h_2)} \qquad \text{(Equation 15)}$$

Also, when mobile station #2 transmits a "ACK/ACK" and mobile station #1 fails to receive control information and does not transmit a response signal, in the base station, a response signal represented by $-h2$ and reference signal represented by $(1+j)(h2)/\sqrt{2}$ are found in the correlation output of mobile station #1. Therefore, in this case, the output of synchronous detection in the base station is as shown in equation 16.

$$\frac{-\sqrt{2}h_2}{(1+j)h_2} = \frac{-\sqrt{2}}{(1+j)} = \frac{-1+j}{\sqrt{2}} \qquad \text{(Equation 16)}$$

Comparing equation 15 and equation 16, when a response signal is not provided from mobile station #1, it is understood that power is provided only on the axis 45 degrees shifted from the I axis and Q axis (i.e., 45-degree axis). Therefore, the base station can detect DTX accurately by measuring how distance the synchronous detection output is from the 45-degree axis.

Embodiment 9

Similar to Embodiment 7, a case will be described with the present embodiment where a base station detects that a mobile station fails to receive control information to carry the resource allocation result of downlink data. Here, using the synchronous detection output of a received signal, the base station decides whether the response signal is an ACK or a NACK, and detects DTX at the same time.

In this case, the identification between ACK, NACK and DTX is performed by a threshold decision using the synchronous detection output. Here, as in Embodiment 1, an example case will be described where mobile station #1 transmits a response signal using PUCCH #1 (in FIG. 7) and mobile station #2 transmits a response signal using PUCCH #0 (in FIG. 7). Here, the modulation scheme of response signals is BPSK. Therefore, constellation #2 (in FIG. 8) is used for the response signal of mobile station #1 and constellation #1 (in FIG. 3) is used for the response signal of mobile station #2. Also, the signal point of a reference signal is the same as the signal point of a NACK in FIG. 3, $(1/\sqrt{2}, 1/\sqrt{2})$.

If mobile station #1 that transmits a desired signal is not interfered with by mobile station #2 at all, the synchronous detection output takes a value close to $(1/\sqrt{2}, -1/\sqrt{2})$ when the desired signal is a NACK, and the synchronous detection output takes a value close to $(-1/\sqrt{2}, 1/\sqrt{2})$ when the desired signal is an ACK. Here, mobile station #1 is influenced by noise, and, consequently, the synchronous detection output does not always concentrate on one point.

Inter-code interference from mobile station #2 to mobile station #1 will be described below. The magnitude of power of inter-code interference (i.e., in the power of a signal that is transmitted by mobile station #2, the power that leaks to the correlation output of mobile station #1) is lower than a desired power, and, consequently, as described above, the synchronous detection output takes a value close to $(1/\sqrt{2}, -1/\sqrt{2})$ when the desired signal is a NACK, and the synchronous detection output takes a value close to $(-1/\sqrt{2}, 1/\sqrt{2})$ when the desired signal is an ACK.

But, when mobile station #1 fails to receive control information to carry the resource allocation result of downlink data, mobile station #1 does not transmit a response signal, and therefore there are only the interference component from mobile station #2 and noise in the correlation output of mobile station #1. In this case, the base station performs a synchronous detection of a response signal of mobile station #2 using a reference signal that leaks from mobile station #2, and, consequently, the synchronous detection output takes a value close to $(-1/\sqrt{2}, -1/\sqrt{2})$ when the response signal of mobile station #2 is an ACK, and the synchronous detection output takes a value close to $(1/\sqrt{2}, 1/\sqrt{2})$ when the response signal of mobile station #2 is a NACK.

That is, it is understood that, when mobile station #1 transmits a response signal, the power of the synchronous detection output of the base station is high in the line direction of −45 degree slope represented by Y=−X, and, when mobile station #1 does not transmit a response signal (i.e., in the case of DTX), the power is low in the line direction of −45 degree slope represented by Y=−X.

Figure 22:
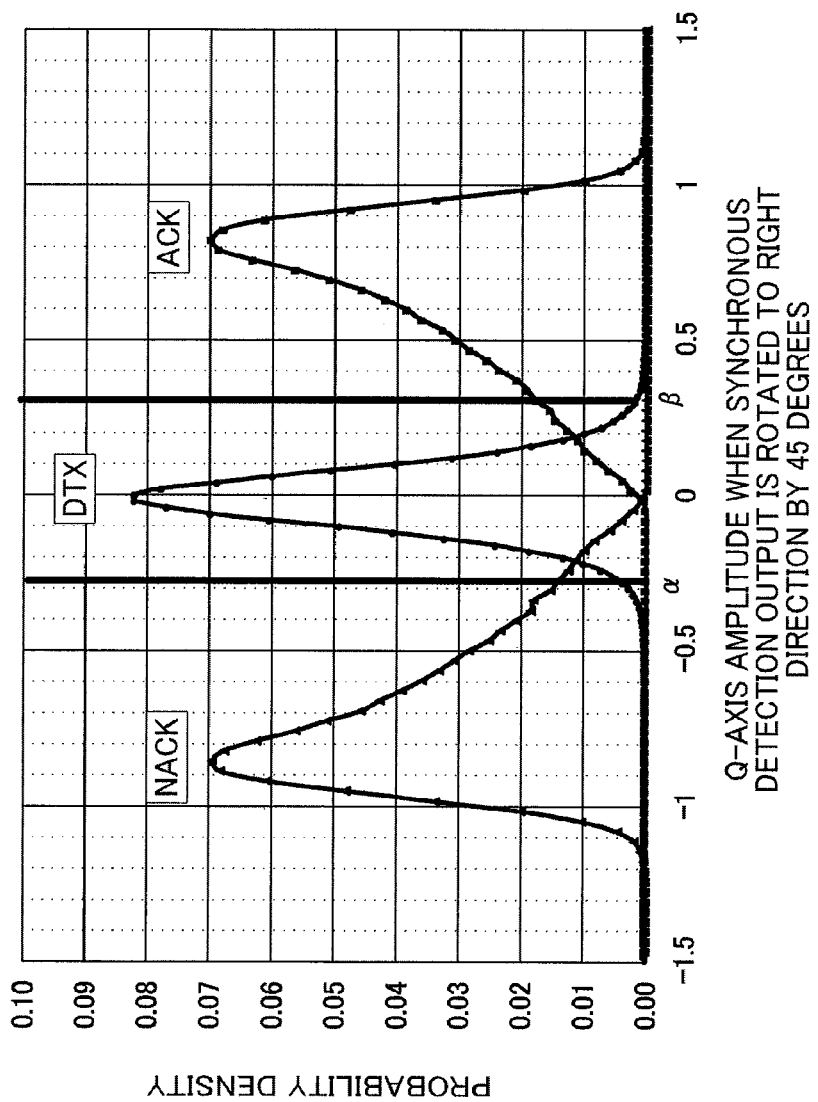
FIG. 22 is a diagram showing a Q-axis amplitude in a case where the synchronous detection output of mobile station #1 is rotated to the right direction by 45 degrees, according to Embodiment 9 of the present invention.

FIG. 22 illustrates the probability distribution density of the Q axis amplitude when the synchronous detection output of mobile station #1 subject to interference is rotated to the right by 45 degrees on the IQ plane. As understood from FIG. 22, if the synchronous detection output is rotated to the right by 45 degrees, when the desired signal is an ACK, the synchronous detection output takes a value close to (0, 1), that is, the Q axis amplitude is close to 1, while, when the desired signal is a NACK, the synchronous detection output takes a value close to (0, −1), that is, the Q axis amplitude is close to −1.

Figure 23:
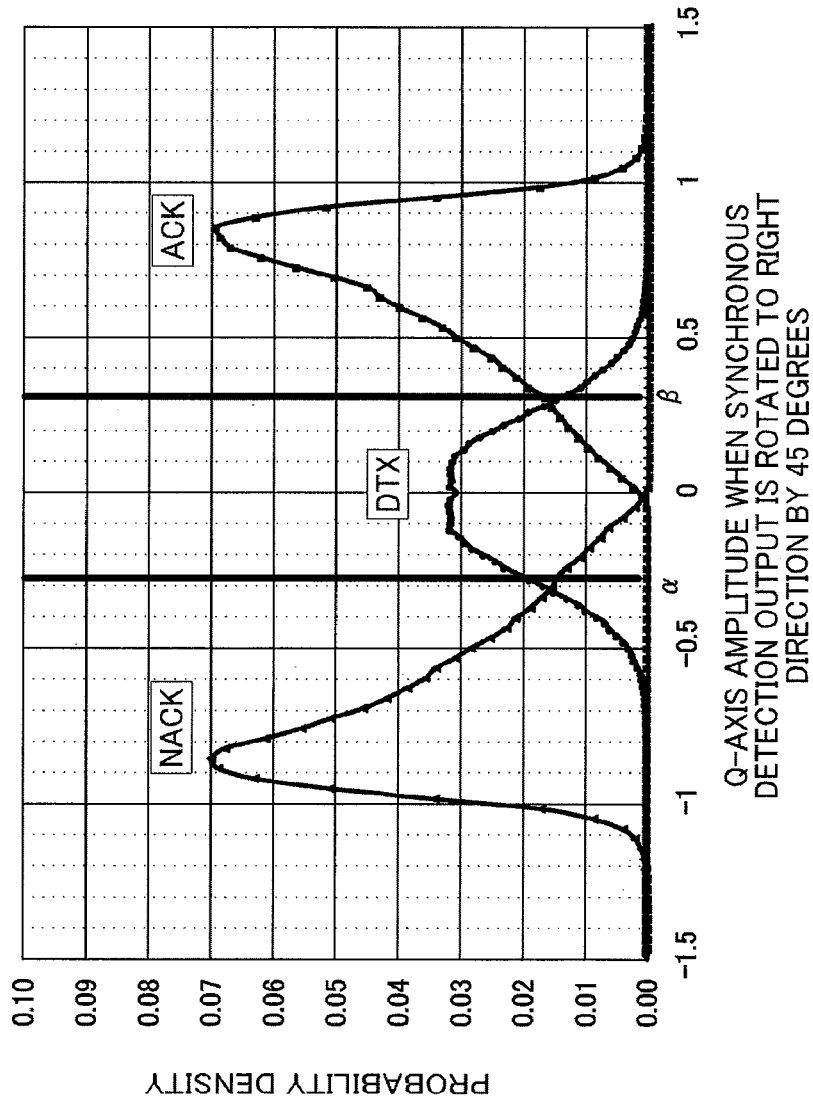
FIG. 23 is a diagram showing a Q-axis amplitude in a case where the synchronous detection output of mobile station #1 is rotated to the right direction by 45 degrees when all mobile stations use the same constellation.

Also, FIG. 23 illustrates the probability distribution density of the Q axis amplitude when the synchronous detection output of mobile station #1 subject to interference is rotated to the right by 45 degrees on the IQ plane, in a case where the constellation of each response signal is not rotated on the cyclic shift axis, that is, in a case where, for example, all mobile stations use the same constellation #2 (in FIG. 8).

In FIG. 22 and FIG. 23, mobile station #1 is interfered with by mobile stations that use other PUCCHs (in FIG. 7) in addition to mobile station #2. Here, the greatest interference is given from mobile station #2 that uses the ZAC sequence of the adjacent cyclic shift value, to mobile station #1. Also, in FIG. 22 and FIG. 23, the ACK occurrence rate and the NACK occurrence rate are equal in all mobile stations, that is, the relationship of ACK:NACK=1:1 holds.

In FIG. 22, α and β represent thresholds for deciding between ACK, NACK and DTX, and, consequently, the base station decides that: mobile station #1 transmits a NACK if "the Q axis amplitude in the case of the synchronous detection output rotated to the right by 45 degrees is less than α"; mobile station #1 transmits an ACK if "the Q axis amplitude in the case of the synchronous detection output rotated to the right by 45 degrees is greater than β"; and mobile station #1 does not transmit a response signal (i.e., DTX) if "the Q axis amplitude in the case of the synchronous detection output rotated to the right by 45 degrees is equal to or greater than a and equal to or less than β."

In FIG. 23, when the synchronous detection output in the case of the greatest interference (i.e., interference from mobile station #2) has power in the same axis direction as the synchronous detection output of the desired signal, and therefore it is difficult to identify between ACK, NACK and DTX using thresholds α and β. By contrast with this, in FIG. 22, the synchronous detection output in the case of the greatest interference has power in the axis direction 90 degrees shifted from the synchronous detection output of the desired signal, and therefore it is possible to identify between ACK, NACK and DTX using thresholds α and β.

That is, in combination with, for example, the scrambling shown in Embodiment 1, even when the ACK occurrence rate and NACK occurrence rate are equal, it is possible to improve the accuracy of identifying between ACK, NACK and DTX in a base station.

Embodiments of the present invention have been described above.

Also, a PUCCH used in the above-described embodiments is a channel to feed back an ACK or NACK, and therefore may be referred to as an "ACK/NACK channel."

Also, it is possible to implement the present invention as described above, even when other control information than a response signal is fed back.

Also, a mobile station may be referred to as a "UE," "MT," "MS" and "STA (station)." Also, a base station may be referred to as a "node B," "BS" or "AP." Also, a subcarrier may be referred to as a "tone." Also, a CP may be referred to as a "GI (Guard Interval)."

Also, the method of error detection is not limited to CRC.

Also, a method of performing transformation between the frequency domain and the time domain is not limited to IFFT and FFT.

Also, a case has been described with the above-described embodiments where the present invention is applied to mobile stations. Here, the present invention is also applicable to a fixed radio communication terminal apparatus in a stationary state and a radio communication relay station apparatus that performs the same operations with a base station as a mobile station. That is, the present invention is applicable to all radio communication apparatuses.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSIs as a result of the advancement of semiconductor technology or a derivative other technology, it is naturally also possible to carry out function block integration using this technology. Application of biotechnology is also possible.

The disclosures of Japanese Patent Application No. 2007-280796, filed on Oct. 29, 2007, Japanese Patent Application No. 2007-339924, filed on Dec. 28, 2007, and Japanese Patent Application No. 2008-268690, filed on Oct. 17, 2008, including the specifications, drawings and abstracts, are incorporated herein by reference in their entireties.

INDUSTRIAL APPLICABILITY

The present invention is applicable to, for example, mobile communication systems.

The invention claimed is:

1. An integrated circuit to control a process, the process comprising:
    transmitting, to a mobile station, control information on one or more control channel elements (CCEs) and transmitting, to the mobile station, data; and
    receiving, from the mobile station, a symbol representing an Acknowledgment (ACK) or Negative Acknowledgement (NACK) for the data, the symbol being multiplied with a sequence defined by one of a plurality of cyclic shift values, the symbol also being multiplied by $e^{j(\pi/2)}$ when an index of a resource to which a physical uplink control channel is mapped is odd, and said one of the plurality of cyclic shift values being determined from the index associated with a CCE number of the one or more CCEs.

2. The integrated circuit according to claim 1, comprising:
    circuitry which, in operation, controls the process;
    at least one input coupled to the circuitry, wherein the at least one input, in operation, inputs data; and
    at least one output coupled to the circuitry, wherein the at least one output, in operation, outputs data.

3. The integrated circuit according to claim 1, wherein the symbol is multiplied by $e^{j(\pi/2)}$ depending on said one of the plurality of cyclic shift values.

4. The integrated circuit according to claim 1, wherein the symbol is multiplied by $e^{j(\pi/2)}$ depending on the sequence defined by said one of the plurality of cyclic shift values.

5. The integrated circuit according to claim 1, wherein the symbol is multiplied by $e^{j(\pi/2)}$ when the resource is one of two resources, and the symbol is multiplied by 1 when the resource is the other of said two resources, said two resources being respectively associated with two cyclic shift values of the plurality of cyclic shift values, and a difference between said two cyclic shift values being a given value.

6. The integrated circuit according to claim 1, wherein the symbol is multiplied with one of a plurality of orthogonal sequences, said one of the plurality of orthogonal sequences being determined from the index.

7. The integrated circuit according to claim 6, wherein the symbol is multiplied by $e^{j(\pi/2)}$ when the resource is one of two resources, and the symbol is multiplied by 1 when the resource is the other of said two resources, said two resources being associated with one of the plurality of orthogonal sequences and being respectively associated with two cyclic shift values of the plurality of cyclic shift values, and a difference between said two cyclic shift values being a given value.

8. The integrated circuit according to claim 1, wherein the symbol is not multiplied by $e^{j(\pi/2)}$ when the index is even.

9. The integrated circuit according to claim 1, wherein the symbol is scrambled by multiplying the symbol by $e^{j(\pi/2)}$ when the index is odd and not multiplying the symbol by $e^{j(\pi/2)}$ when the index is even.

10. An integrated circuit comprising circuitry, which, in operation:
    controls transmission, to a mobile station, of control information on one or more control channel elements (CCEs) and transmission, to the mobile station, of data; and
    controls reception, from the mobile station, of a symbol representing an Acknowledgment (ACK) or Negative Acknowledgement (NACK) for the data, the symbol being multiplied with a sequence defined by one of a plurality of cyclic shift values, the symbol also being multiplied by $e^{j(\pi/2)}$ when an index of a resource to which a physical uplink control channel is mapped is odd, and said one of the plurality of cyclic shift values being determined from the index associated with a CCE number of the one or more CCEs.

11. The integrated circuit according to claim 10, comprising:
    at least one input coupled to the circuitry, wherein the at least one input, in operation, inputs data; and
    at least one output coupled to the circuitry, wherein the at least one output, in operation, outputs data.

12. The integrated circuit according to claim 10, wherein the symbol is multiplied by $e^{j(\pi/2)}$ depending on said one of the plurality of cyclic shift values.

13. The integrated circuit according to claim 10, wherein the symbol is multiplied by $e^{j(\pi/2)}$ depending on the sequence defined by said one of the plurality of cyclic shift values.

14. The integrated circuit according to claim 10, wherein the symbol is multiplied by $e^{j(\pi/2)}$ when the resource is one of two resources, and the symbol is multiplied by 1 when the resource is the other of said two resources, said two resources being respectively associated with two cyclic shift values of the plurality of cyclic shift values, and a difference between said two cyclic shift values being a given value.

15. The integrated circuit according to claim 10, wherein the symbol is multiplied with one of a plurality of orthogonal sequences, said one of the plurality of orthogonal sequences being determined from the index.

16. The integrated circuit according to claim 15, wherein the symbol is multiplied by $e^{j(\pi/2)}$ when the resource is one of two resources, and the symbol is multiplied by 1 when the resource is the other of said two resources, said two resources being associated with one of the plurality of orthogonal sequences and being respectively associated with two cyclic shift values of the plurality of cyclic shift values, and a difference between said two cyclic shift values being a given value.

17. The integrated circuit according to claim 10, wherein the symbol is not multiplied by $e^{j(\pi/2)}$ when the index is even.

18. The integrated circuit according to claim 10, wherein the symbol is scrambled by multiplying the symbol by $e^{j(\pi/2)}$ when the index is odd and not multiplying the symbol by $e^{j(\pi/2)}$ when the index is even.

* * * * *